United States Patent
Yoon et al.

(10) Patent No.: US 11,909,336 B2
(45) Date of Patent: Feb. 20, 2024

(54) MULTI DEGREE OF FREEDOM MAGNETIC LEVITATION SYSTEM BY SINGLE BODY ACTUATOR

(71) Applicant: UNIVERSITY INDUSTRY FOUNDATION, YONSEI UNIVERSITY, Seoul (KR)

(72) Inventors: JunYoung Yoon, Seoul (KR); JaeWoo Jung, Seoul (KR); EunKyu Kim, Seoul (KR); HyeongMin Yoon, Gyeonggi-do (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 17/863,971

(22) Filed: Jul. 13, 2022

(65) Prior Publication Data
US 2023/0018678 A1 Jan. 19, 2023

(30) Foreign Application Priority Data
Jul. 13, 2021 (KR) .................. 10-2021-0091857

(51) Int. Cl.
*H02N 15/00* (2006.01)
*H02K 41/03* (2006.01)
*H02K 11/22* (2016.01)

(52) U.S. Cl.
CPC ............. *H02N 15/00* (2013.01); *H02K 11/22* (2016.01); *H02K 41/031* (2013.01); *H02K 2201/18* (2013.01)

(58) Field of Classification Search
CPC ........ H02K 1/143; H02K 11/22; H02K 21/44; H02K 2201/18; H02K 41/031; H02N 15/00
See application file for complete search history.

(56) References Cited

U.S. PATENT DOCUMENTS

| | | | | |
|---|---|---|---|---|
| 5,118,977 A | * | 6/1992 | Bertram | H02K 7/1185 310/216.037 |
| 5,619,086 A | * | 4/1997 | Steiner | H02K 3/524 242/437.2 |
| 5,675,226 A | * | 10/1997 | Riola' | H02K 29/03 318/400.41 |
| 5,708,406 A | * | 1/1998 | Tsunoda | H01F 7/14 310/216.022 |
| 5,757,108 A | * | 5/1998 | Suzuki | H02K 1/141 310/67 R |
| 5,780,951 A | * | 7/1998 | Stephens | H02K 1/148 310/40 MM |
| 6,861,819 B2 | * | 3/2005 | Marioni | H02P 6/20 318/700 |

(Continued)

*Primary Examiner* — Naishadh N Desai
(74) *Attorney, Agent, or Firm* — NORTON ROSE FULBRIGHT US LLP

(57) ABSTRACT

The present disclosure relates to an actuator. The actuator includes at least two iron cores, each iron core including a pole extending in a first direction parallel to a direction of gravity; a permanent magnet disposed between the at least two iron cores so as to generate a magnetic field along a shape of a combination of the at least two iron cores arranged so as to be adjacent to each other in a direction not parallel to the first direction; and a winding wound around the pole of each of the at least two iron cores.

17 Claims, 29 Drawing Sheets

(56) References Cited

U.S. PATENT DOCUMENTS

| | | | | |
|---|---|---|---|---|
| 8,350,425 B2* | 1/2013 | Green | ................... | H02K 29/10 |
| | | | | 310/68 B |
| 8,432,078 B2* | 4/2013 | Chen | ..................... | H02K 29/08 |
| | | | | 310/68 B |
| 2007/0052318 A1* | 3/2007 | Marioni | ............... | H02K 21/185 |
| | | | | 310/216.037 |
| 2013/0076194 A1* | 3/2013 | Benner, Jr. | ............ | H02K 33/16 |
| | | | | 310/216.022 |

* cited by examiner

MULTI DEGREE OF FREEDOM MAGNETIC LEVITATION SYSTEM BY SINGLE BODY ACTUATOR

CROSS-REFERENCE TO RELATED APPLICATIONS

This application claims the benefit of priority to Korean Patent Application No. 10-2021-0091857, filed Jul. 13, 2021, the entire contents of which are hereby incorporated by reference in their entirety.

FIELD OF THE INVENTION

The present disclosure relates to a magnetic levitation actuator and a multi-degrees of freedom magnetic levitation system using the same.

DESCRIPTION OF RELATED ART

In an industrial group that utilizes a precision machining system and a precision transfer system, there is a great demand for magnetic levitation technology that can perform tasks in a non-contact manner in order to prevent deterioration of a function and durability due to mechanical contact.

Single degree-of-freedom (DOF) magnetic levitation actuators have been extensively researched in prior art. Such 1-DOF actuators however have only low passive stiffness and damping in the non-driving DOFs, making levitated objects vulnerable to an external factor such as disturbance. This limits the application of 1-DOF levitation actuators to various industries.

In order to solve this problem, there have been attempts to drive in multi-DOF utilizing additional actuators. Such approaches however require more power consumption and footprint, thereby limiting the power efficiency and system compactness.

SUMMARY OF THE INVENTION

One purpose of the present disclosure is to provide an actuator and a multi-degrees of freedom magnetic levitation system using the actuator in which multi-axis active control may be achieved, and the actuator and a sensor module may be compactly configured to measure a position of a magnetically-levitated object stably in a wide range and to secure a free space as much as possible, and thus the magnetic levitation system may be applied to various purposes.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.//

One aspect of the present disclosure provides an actuator comprising: at least two iron cores, each iron core including a pole extending in a first direction parallel to a direction of gravity; and a permanent magnet disposed between the at least two iron cores so as to generate a magnetic field along a shape of a combination of the at least two iron cores arranged so as to be adjacent to each other in a direction not parallel to the first direction; and a winding wound around the pole of each of the at least two iron cores.

In one implementation of the actuator, the at least two iron cores include: a first iron core including a first pole extending in the first direction and a second pole extending in a second direction perpendicular to the first direction from one side end of the first pole; and a second iron core including a third pole extending in a parallel manner to the extension direction of the first pole, and a fourth pole extending in a parallel manner to the extension direction of the second pole from one side end of the third pole and having an end face facing the end face of the second pole, wherein the winding includes: a first winding wound around the first pole; and a second winding wound around the third pole, wherein the permanent magnet is disposed between the end face of the second pole and the end face of the fourth pole so that a first pole and a second pole thereof are in contact with the end face of the second pole and the end face of the fourth pole, respectively.

In one implementation of the actuator, a lower end of each of the first pole and the third pole has an inclined face facing an inner space defined between the first pole and the third pole.

In one implementation of the actuator, the at least two iron cores include: a first iron core disposed at a first azimuth around an imaginary axial line parallel to the first direction, wherein the first iron core includes a first pole extending in the first direction, and a second pole extending from one side end of the first pole in a second direction perpendicular to the first direction, wherein the second pole has an end face facing the axial line; a second iron core disposed at a second azimuth around the axial line, wherein the second iron core includes a third pole extending in a parallel manner to the extension direction of the first pole, and a fourth pole extending from one side end of the third pole in the second direction, wherein the fourth pole has an end face facing the axial line; and a third iron core disposed at a third azimuth around the axial line, wherein the third iron core includes a fifth pole extending in a parallel manner to the extension direction of the first pole, and a sixth pole extending from one side end of the fifth pole in the second direction, wherein the sixth pole has an end face facing the axial line, wherein the winding includes: a first winding wound around the first pole; a second winding wound around the third pole; and a third winding wound around the fifth pole; wherein the permanent magnet includes: a first permanent magnet fixed to the end face of the second pole so that a magnetic flux thereof is directed toward the axial line; a second permanent magnet fixed to the end face of the fourth pole so that a magnetic flux thereof is directed toward the axial line; and a third permanent magnet fixed to the end face of the sixth pole so that a magnetic flux thereof is directed toward the end face of the sixth pole.

In one implementation of the actuator, a lower end of each of the first pole, the third pole and the fifth pole has an inclined face facing an inner space defined between the first pole, the third pole and the fifth pole.

In one implementation of the actuator, the at least two iron cores include: a first iron core including a first pole extending in the first direction, and a second pole extending in a second direction perpendicular to the first direction from one side end of the first pole; a second iron core including a third pole extending in a parallel manner to the extension direction of the first pole, and a fourth pole extending in a parallel manner to the extension direction of the second pole from one side end of the third pole and having an end face facing an end face of the second pole; a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole, wherein the winding includes: a first winding wound around the first pole; a second winding wound around the third pole; a third winding wound around the fifth pole; and a fourth winding wound around the seventh pole, wherein the permanent magnet includes: a first permanent magnet fixed to the end face of the second pole such that a magnetic flux thereof is directed toward the end face of the fourth pole facing the end face of the second pole; a second permanent magnet fixed to the end face of the fourth pole such that a magnetic flux thereof is directed toward the end face of the fourth pole; a third permanent magnet fixed to the end face of the sixth pole such that a magnetic flux thereof is directed toward the end face of the eighth pole facing the end face of the sixth pole; and a fourth permanent magnet fixed to the end face of the eighth pole such that a magnetic flux thereof is directed toward the end face of the eighth pole.

In one implementation of the actuator, the at least two iron cores include: a first iron core including a first pole extending in the first direction, and a second pole extending in a second direction perpendicular to the first direction from one side end of the first pole; a second iron core including a third pole extending in a parallel manner to the extension direction of the first pole, and a fourth pole extending in a parallel manner to the extension direction of the second pole from one side end of the third pole and having an end face facing an end face of the second pole; a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole, wherein the winding includes: a first winding wound around the first pole; a second winding wound around the third pole; a third winding wound around the fifth pole; and a fourth winding wound around the seventh pole, wherein the permanent magnet includes: a first permanent magnet fixed to the end face of the second pole such that a magnetic flux thereof is directed toward the end face of the fourth pole facing the end face of the second pole; a second permanent magnet fixed to the end face of the fourth pole such that a magnetic flux thereof is directed toward the end face of the second pole; a third permanent magnet fixed to the end face of the sixth pole such that a magnetic flux thereof is directed toward the end face of the sixth pole; and a fourth permanent magnet fixed to the end face of the eighth pole so that a magnetic flux thereof is directed toward the end face of the eighth pole.

In one implementation of the actuator, a lower end of each of the first pole, the third pole, the fifth pole and the seventh pole has an inclined face facing an inner space defined between the first pole, the third pole, the fifth pole and the eighth pole.

In one implementation of the actuator, the at least two iron cores include: a first iron core disposed at a first azimuth around an imaginary axial line parallel to the first direction, wherein the first iron core includes a first pole extending in the first direction, and a second pole extending in a second direction perpendicular to the first direction from one side end of the first pole and having an end face facing the axial line; a second iron core disposed at a second azimuth around the axial line, wherein the second iron core includes a third pole extending in a parallel manner to the extension direction of the first pole, and a fourth pole extending in the second direction from one side end of the third pole and having an end face facing the axial line; and a third iron core disposed at a third azimuth around the axial line, wherein the third iron core includes a fifth pole extending in a parallel manner to the extension direction of the first pole, and a sixth pole extending from one side end of the fifth pole in the second direction and having an end face facing the axial line, wherein the winding includes: a first winding wound around the first pole; a second winding wound around the third pole; and a third winding wound around the fifth pole, wherein the actuator further comprises a central iron core disposed under the end faces of the second pole, the fourth pole, and the sixth pole and being in contact with the second pole, the fourth pole and the sixth pole, wherein the central iron core extends in a parallel manner to the first direction, wherein the permanent magnet is fixed to a bottom face of the central iron core such that a magnetic flux thereof is directed away from the bottom face of the central iron core.

In one implementation of the actuator, the at least two iron cores include: a first iron core disposed at a first azimuth around an imaginary axial line parallel to the first direction, wherein the first iron core includes a first pole extending in the first direction, and a second pole extending in a second direction perpendicular to the first direction from one side end of the first pole and having an end face facing the axial line; a second iron core disposed at a second azimuth around the axial line, wherein the second iron core includes a third pole extending in a parallel manner to the extension direction of the first pole, and a fourth pole extending in the second direction from one side end of the third pole and having an end face facing the axial line; and a third iron core disposed at a third azimuth around the axial line, wherein the third iron core includes a fifth pole extending in a parallel manner to the extension direction of the first pole, and a sixth pole extending from one side end of the fifth pole in the second direction and having an end face facing the axial line, wherein the actuator further comprises a central iron core in contact with the first to third permanent magnets and disposed under the first to third permanent magnets, wherein the central iron core extends in a parallel manner to the first direction, wherein the winding includes: a first winding wound around the first pole; a second winding wound around the third pole; and a third winding wound around the fifth pole, wherein the permanent magnet includes: a first permanent magnet fixed to the end face of the second pole so that a magnetic flux thereof is directed toward the axial line; a second permanent magnet fixed to the end face of the fourth pole so that a magnetic flux thereof is directed toward the axial line; and a third permanent magnet fixed to the end face of the sixth pole so that a magnetic flux thereof is directed toward the axial line.

In one implementation of the actuator, a lower end of each of the first pole, the third pole and the fifth pole has an inclined face facing an inner space defined between the first pole, the third pole and the fifth pole.

In one implementation of the actuator, the at least two iron cores include: a first iron core including a first pole extending in the first direction, and a second pole extending in a second direction perpendicular to the first direction from one side end of the first pole; a second iron core including a third pole extending in a parallel manner to the extension direction of the first pole, and a fourth pole extending in a parallel manner to the extension direction of the second pole from one side end of the third pole and having an end face facing an end face of the second pole; a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole, wherein the actuator further comprises a central iron core contacting the second pole, the fourth pole, the sixth pole and the eighth pole and disposed under the end faces of the second pole, the fourth pole, the sixth pole and the eighth pole, wherein the central iron core extends in a parallel manner to the first direction, wherein the winding includes: a first winding wound around the first pole; a second winding wound around the third pole; a third winding wound around the fifth pole; and a fourth winding wound around the seventh pole, wherein the permanent magnet is fixed to a bottom face of the central iron core such that a magnetic flux thereof is directed away from the bottom face of the central iron core.

In one implementation of the actuator, the at least two iron cores include: a first iron core including a first pole extending in the first direction, and a second pole extending in a second direction perpendicular to the first direction from one side end of the first pole; a second iron core including a third pole extending in a parallel manner to the extension direction of the first pole, and a fourth pole extending in a parallel manner to the extension direction of the second pole from one side end of the third pole and having an end face facing an end face of the second pole; a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole, wherein the winding includes: a first winding wound around the first pole; a second winding wound around the third pole; a third winding wound around the fifth pole; and a fourth winding wound around the seventh pole, wherein the permanent magnet includes: a first permanent magnet fixed to the end face of the second pole such that a magnetic flux thereof is directed toward the end face of the fourth pole facing the end face of the second pole; a second permanent magnet fixed to the end face of the fourth pole such that a magnetic flux thereof is directed toward the end face of the second pole; a third permanent magnet fixed to the end face of the sixth pole so that a magnetic flux thereof is directed toward the end face of the eighth pole facing the end face of the sixth pole; and a fourth permanent magnet fixed to the end face of the eighth pole so that a magnetic flux thereof is directed toward the end face of the sixth pole, wherein the actuator further comprises a central iron core contacting the first to fourth permanent magnets and disposed under the first to fourth permanent magnets, wherein the central iron core extends in a parallel manner to the first direction.

In one implementation of the actuator, a lower end of each of the first pole, the third pole, the fifth pole and the seventh pole has an inclined face facing an inner space defined between the first pole, the third pole, the fifth pole and the eighth pole.

Another aspect of the present disclosure provides a multi-degrees of freedom magnetic levitation system comprising: the actuator according to one of the implementations as defined above; and a sensor module including at least two optical-fiber sensors, wherein each of the at least two optical-fiber sensors is disposed under each winding of the actuator, wherein the at least two optical-fiber sensors measure a position of a magnetically-levitated object, wherein the system is configured to apply a current to each winding to control the position of the magnetically-levitated object, based on the measured position of the magnetically-levitated object.

In the actuator according to the present disclosure and the multi-degrees of freedom magnetic levitation system using the same, the multi-axis active control that allows the magnetically-levitated object to move in the vertical direction (the Z direction), the first horizontal direction (the X direction) and the second horizontal direction (the Y direction) that intersects the X direction may be achieved, and the power consumption to control the position of the magnetically-levitated object may be minimized. The actuator and the sensor module may be compactly configured. Thus, the position of the magnetically-levitated object may be measured stably in a wide range. A free space as much as possible may be secured such that the system may be applied to various purposes.

In addition to the effects as described above, specific effects in accordance with the present disclosure will be described together with the detailed description for carrying out the disclosure.

DETAILED DESCRIPTION OF THE INVENTION

Figure 1:
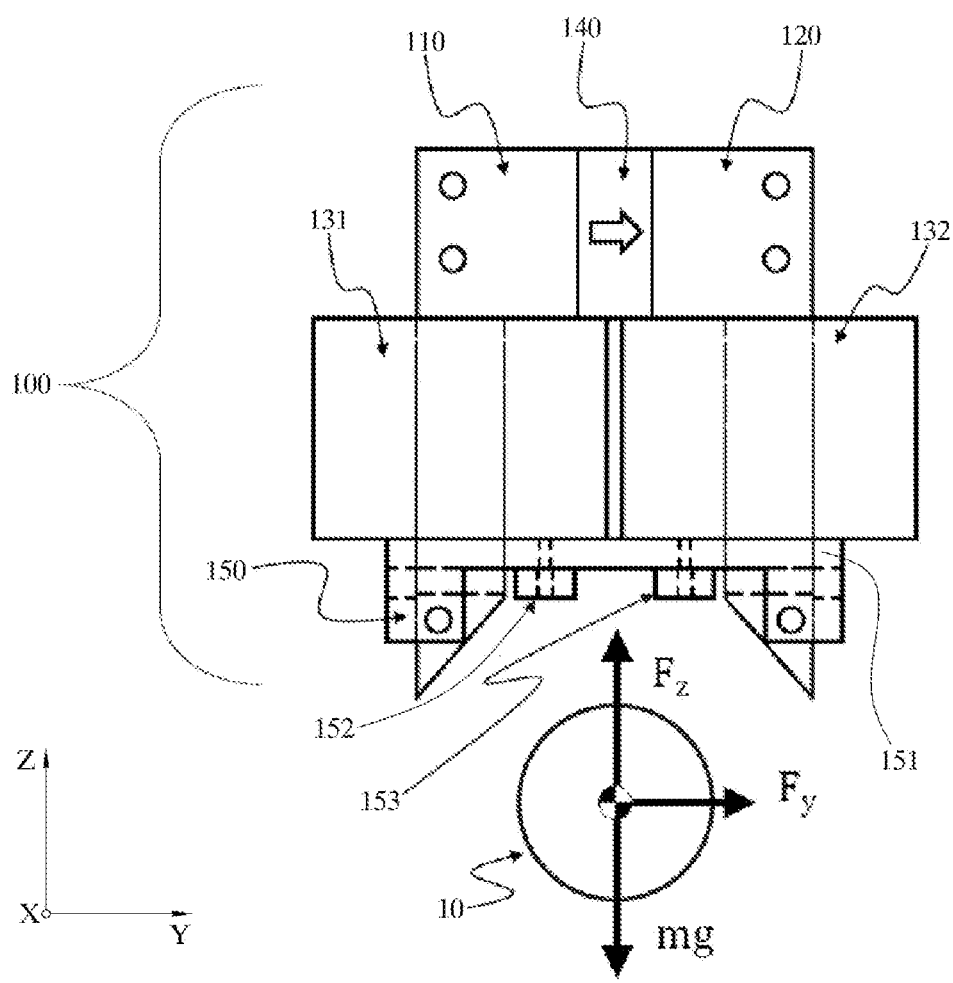
FIG. 1 is a perspective view for illustrating an actuator according to a first embodiment of the present disclosure and a multi-degrees of freedom magnetic levitation system using the same.

Hereinafter, an actuator according to an embodiment of the present disclosure and a multi-degrees of freedom magnetic levitation system using the same will be described in detail with reference to the accompanying drawings.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the figures is turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

An actuator according to the present disclosure includes at least two iron cores, each core including a pole extending in a first direction and in a parallel manner to a direction of gravity; and a permanent magnet disposed between the at least two iron cores so as to generate a magnetic field along a shape of a combination of the at least two iron cores arranged so as to be adjacent to each other in a direction not parallel to the first direction.

Hereinafter, each of various embodiments of an actuator according to the present disclosure, and each of embodiments of a multi-degrees of freedom magnetic levitation system including the actuator of each embodiment will be described.

Figure 2:
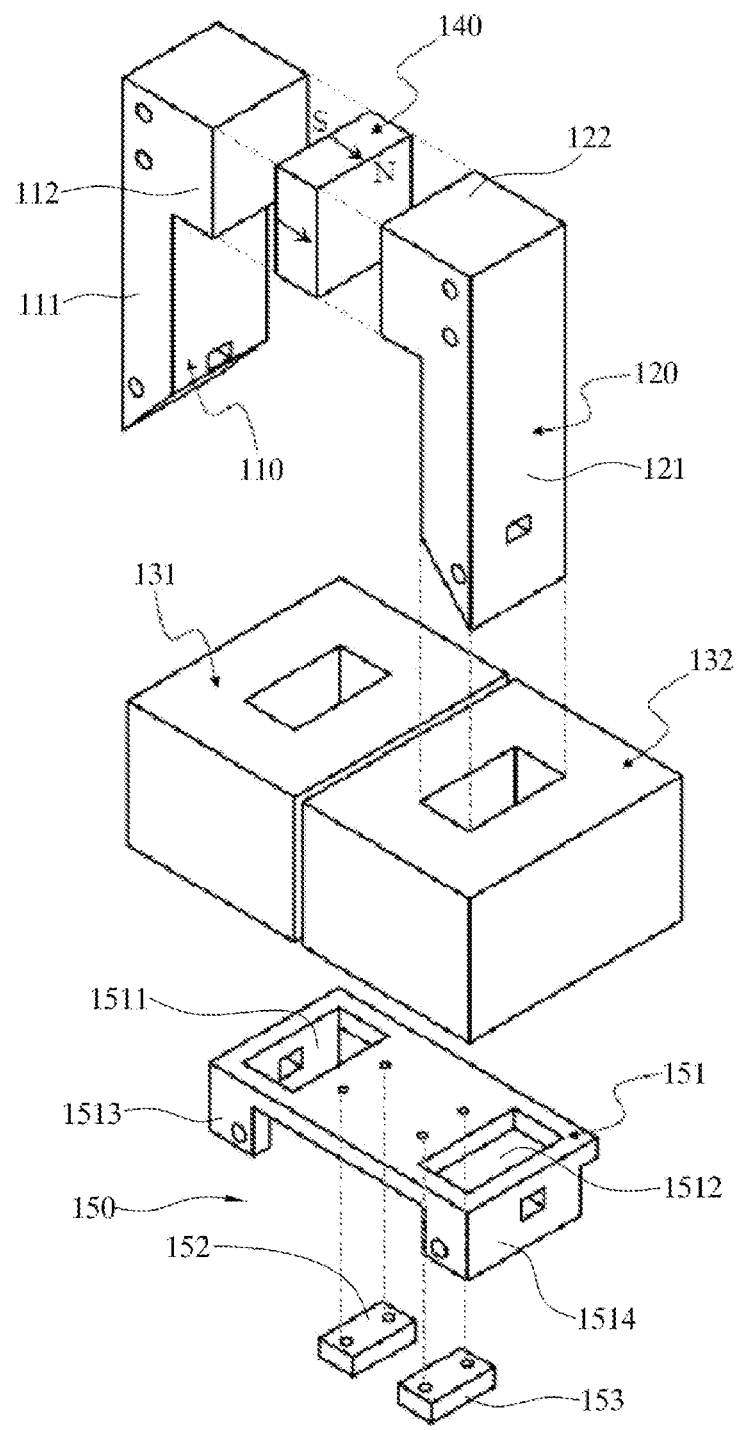
FIG. 2 is an exploded perspective view of FIG. 1.

FIG. 1 is a perspective view for illustrating an actuator according to a first embodiment of the present disclosure and a multi-degrees of freedom magnetic levitation system using the same. FIG. 2 is an exploded perspective view of FIG. 1. FIG. 3 to FIG. 7 are diagrams for illustrating a process in which the multi-degrees of freedom magnetic levitation system using the actuator according to the first embodiment of the present disclosure controls a position of a magnetically-levitated object.

Referring to FIG. 1 and FIG. 2, an actuator 100 according to the first embodiment of the present disclosure may include a first iron core 110, a second iron core 120, a first winding 131, a second winding 132 and a permanent magnet 140.

The first iron core 110 includes a first pole 111 extending in the first direction and a second pole 112 extending in a second direction perpendicular to the first direction from one side end of the first pole 111. This first iron core 110 has a 'L' shape. In the first iron core 110, the first pole 111 extends in a parallel manner to the direction of gravity.

The second iron core 120 includes a third pole 121 extending in a parallel manner to the extension direction of the first pole 111, and a fourth pole 122 extending in a parallel manner to the extension direction of the second pole from one side end of the third pole. This second iron core 120 has a 'L' shape. The first and second iron cores 110 and 120 are arranged such that the third pole 121 is parallel to the first pole 111 and an end face of the fourth pole 122 faces an end face of the second pole 112. The first iron core 110 and the second iron core 120 are arranged in a symmetrical manner with each other.

The first winding 131 is composed of a coil wound around the first pole 111 so as to surround the first pole 111.

The second winding 132 is composed of a coil wound around the third pole 121 so as to surround the third pole 121.

The permanent magnet 140 is disposed between an end face of the second pole 112 and the end face of the fourth pole 122 such that a first pole and a second pole thereof are in contact with the end face of the second pole 112 and the end face of the fourth pole 122, respectively. In this regard, the first pole may be a S pole, while the second pole may be an N pole. The first pole may be in contact with the end face of the second pole 112 while the second pole may be in contact with the end face of the fourth pole 122.

In one example, a lower end of each of the first pole 111 and the third pole 121 may have an inclined face facing an inner space therebetween.

Referring to FIG. 1 and FIG. 2, the multi-degrees of freedom magnetic levitation system according to the first embodiment of the present disclosure may include the actuator 100 according to the first embodiment and a sensor module 150.

Since a configuration of the actuator 100 has been described in detail above, a detailed description thereof will be omitted.

The sensor module 150 may include an adapter 151; and a first optical-fiber sensor 152 and a second optical-fiber sensor 153 disposed under the first and second windings 131 and 132 of the actuator 100, respectively.

The adapter 151 may include a top plate 151a having a first core receiving hole 1511 defined therein into which the first pole 111 is inserted and a second core receiving hole 1512 defined therein into which the third pole 121 is inserted, a first side plate 1513 and a second side plate 1514 extending respectively from both opposing ends in a length direction of the top plate 151a in a direction parallel to an extension direction of each of the first pole 111 and the third pole 121. The first side plate 1513 may cover an outer face perpendicular to the length direction of the adapter 151 of the first pole 111 inserted into the first core receiving hole 1511. The second side plate 1514 may cover an outer face perpendicular to the length direction in the adapter 151 of the third pole 121 inserted into the second core receiving hole 1512.

The first optical-fiber sensor 152 may be positioned under the first winding 131, and the second optical-fiber sensor 153 may be positioned under the second winding 132. To this end, the first optical-fiber sensor 152 may be fixed to a bottom face of the top plate 151a of the adapter 151 so as to be positioned inwardly of the first pole 111 facing the third pole 121. The second optical-fiber sensor 153 may be fixed to the bottom face of the top plate 151a of the adapter 151 so as to be positioned inwardly of the third pole 121 facing the first pole 111.

The first optical-fiber sensor 152 and the second optical-fiber sensor 153 may measure a position of a magnetically-levitated object 10 positioned between the first iron core 110 and the second iron core 120, and may transmit the measured position information to a controller (not shown) of the multi-degrees of freedom magnetic levitation system.

Further, the controller of the multi-degrees of freedom magnetic levitation system according to the first embodiment of the present disclosure may apply a current to each of the first winding 131 and the second winding 132 to control the position of the magnetically-levitated object 10, based on the position information of the magnetically-levitated object 10 measured by the first optical-fiber sensor 152 and the second optical-fiber sensor 153.

Figure 3:
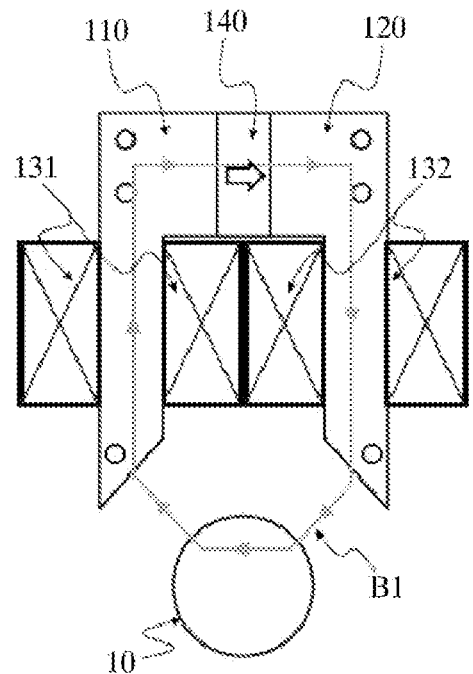
FIG. 3 to FIG. 7 are diagrams for illustrating a process in which the multi-degrees of freedom magnetic levitation system using the actuator according to the first embodiment of the present disclosure controls a position of a magnetically-levitated object.
Figure 3:
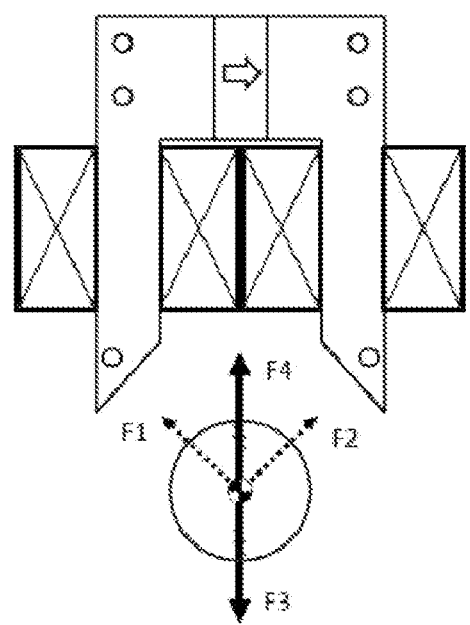

In the multi-degrees of freedom magnetic levitation system according to the first embodiment of the present disclosure, the permanent magnet 140 may generate a first magnetic field B1 along a shape of a combination of the first iron core 110 and the second iron core 120 as shown in FIG. 3. In this regard, magnitudes of attractive forces F1 and F2 acting between the magnetically-levitated object 10 and the first iron core 110 and the second iron core 120, respectively are equal to each other. Accordingly, when the magnetically-levitated object 10 is positioned between the first pole 111 of the first iron core 110 and the third pole 121 of the second iron core 120, the magnetically-levitated object 10 may be levitated under the first magnetic field B1 generated by the permanent magnet 140. In this regard, each of the first pole 111 and the third pole 121 has the inclined face facing an inner space therebetween so that the magnetic fluxes acting between the first iron core 110, the second iron core 120 and the magnetically-levitated object 10 may be easily concentrated.

The multi-degrees of freedom magnetic levitation system according to the first embodiment of the present disclosure may adjust a direction and an intensity of the current independently applied to each of the first winding 131 and the second winding 132 to control the position of the magnetically-levitated object 10 in each of +Z, −Z, +Y, and −Y directions.

Figure 4:
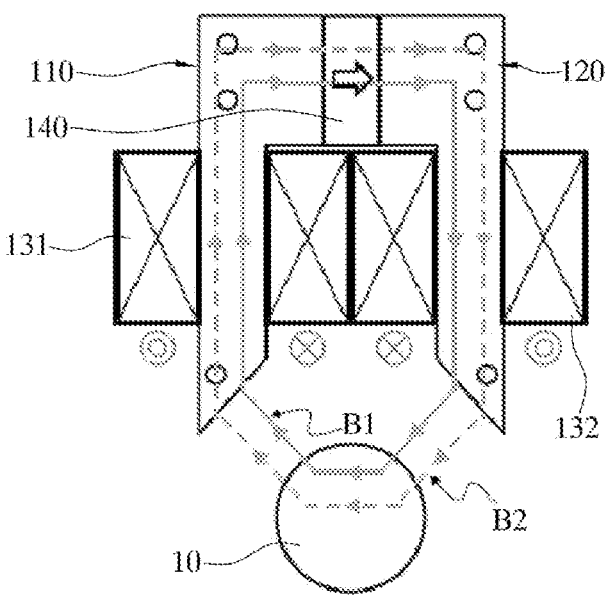
Figure 4:
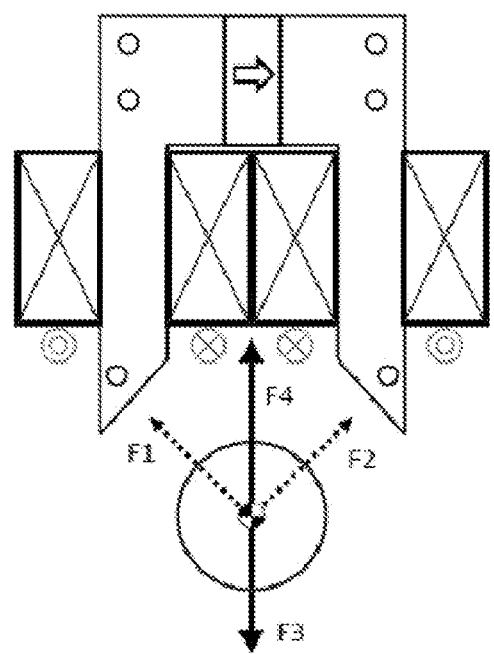

When the system intends to move the magnetically-levitated object 10 in the +Z direction, the system may independently apply the current to each of the first winding 131 and the second winding 132 so that a second magnetic field B2 is induced in the same direction as that of the first magnetic field B1, as shown in FIG. 4, such that a total magnetic field intensity increases, such that a levitation force F4 acting on the magnetically-levitated object 10 in the +Z direction increases, so that the magnetically-levitated object 10 may move in the +Z direction.

Figure 5:
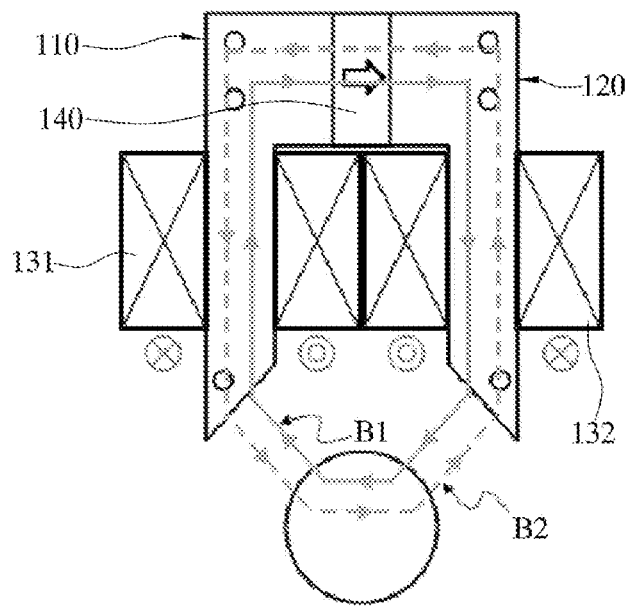
Figure 5:
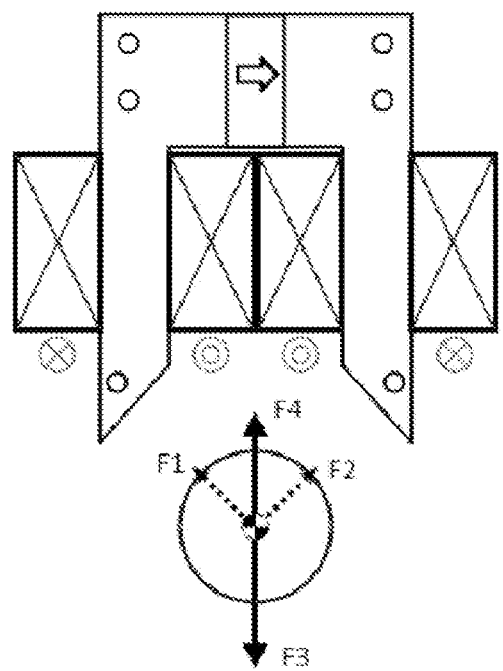

When the system intends to move the magnetically-levitated object 10 in the −Z direction, the system may independently apply the current to each of the first winding 131 and second winding 132 so that the second magnetic field B2 is induced in the opposite direction to a direction of the first magnetic field B1, as shown in FIG. 5, such that the levitation force F4 is decreased, thereby moving the magnetically-levitated object 10 in the −Z direction.

Figure 6:
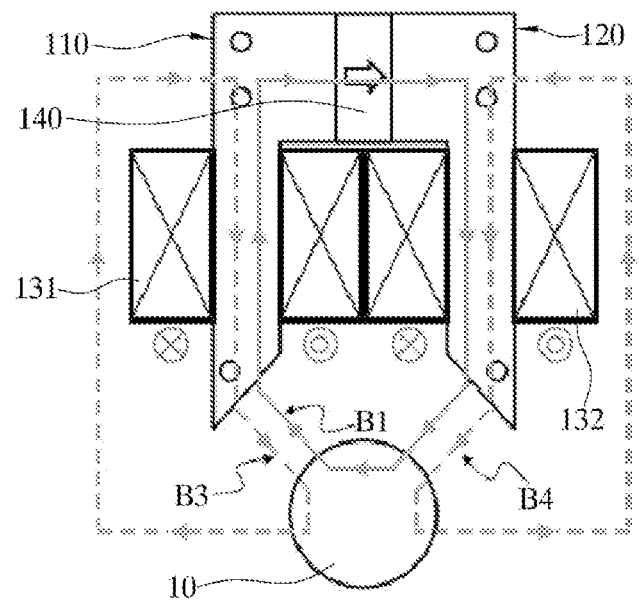
Figure 6:
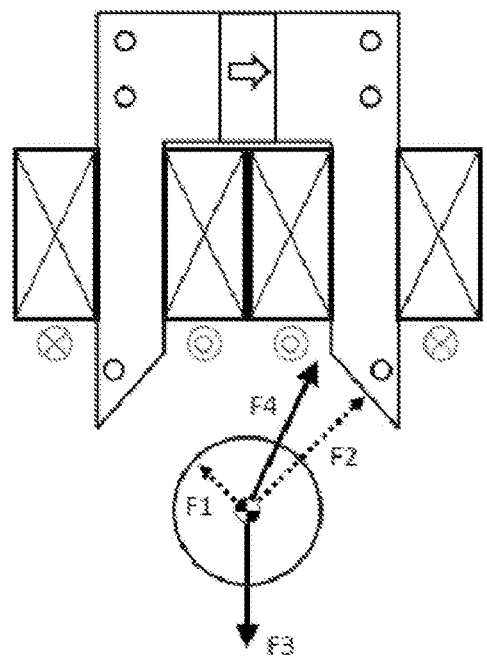

When the system intends to move the magnetically-levitated object 10 in the +Y direction, the system may independently apply the current to the first winding 131 so that a direction of a third magnetic field B3 generated between the first iron core 110 and the magnetically-levitated object 10 is opposite to a direction of the first magnetic field B1 generated by the permanent magnet 140, as shown in FIG. 6, such that an attraction force F1 between the first iron core 110 and the magnetically-levitated object 10 decreases. At the same time, the system may independently apply the current to the second winding 132 so that a direction of a fourth magnetic field B4 generated between the second iron core 120 and the magnetically-levitated object 10 is the same as the direction of the first magnetic field B1 generated by the permanent magnet 140, such that an attractive force F2 between the second iron core 120 and the magnetically-levitated object 10 increases. Thus, a force acting in the +Y direction may be added to the levitation force F4 acting on the magnetically-levitated object 10, thereby moving the magnetically-levitated object 10 in the +Y direction.

Figure 7:
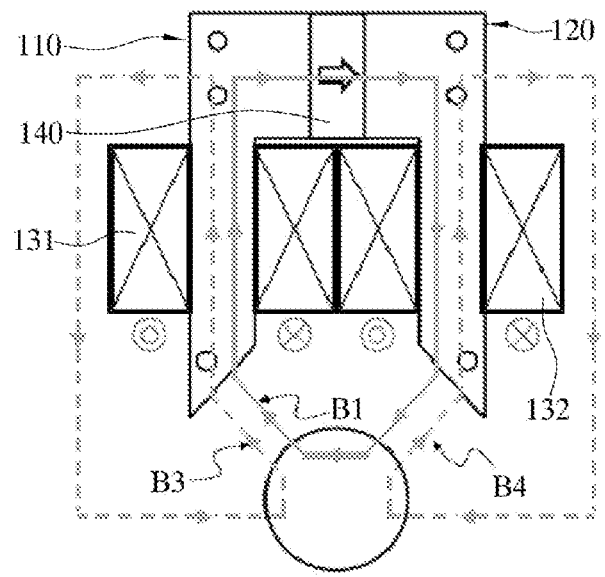
Figure 7:
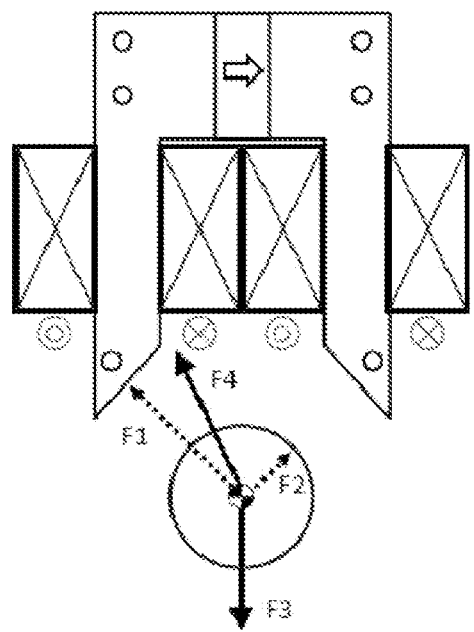

When the system intends to move the magnetically-levitated object 10 in the −Y direction, the system may independently apply the current to the first winding 131 so that the direction of the third magnetic field B3 generated between the first iron core 110 and the magnetically-levitated object 10 is the same as the direction of the first magnetic field B1 generated by the permanent magnet 140, as shown in FIG. 7, such that the attraction force F1 between the first iron core 110 and the magnetically-levitated object 10 increases. At the same time, the system may independently apply the current to the second winding 132 so that the direction of the fourth magnetic field B4 generated between the second iron core 120 and the magnetically-levitated object 10 is opposite to the direction of the first magnetic field B1 generated by the permanent magnet 140, such that the attractive force F2 between the second iron core 120 and the magnetically-levitated object 10 decreases. Thus, a force acting in the −Y direction may be added to the levitation force F4, thereby moving the magnetically-levitated object 10 in the −Y direction.

In this manner, the multi-degrees of freedom magnetic levitation system according to the first embodiment of the present disclosure may enable the movements of the magnetically-levitated object 10 in the vertical direction of the Z-axis and the horizontal direction of the Y-axis.

Figure 8:
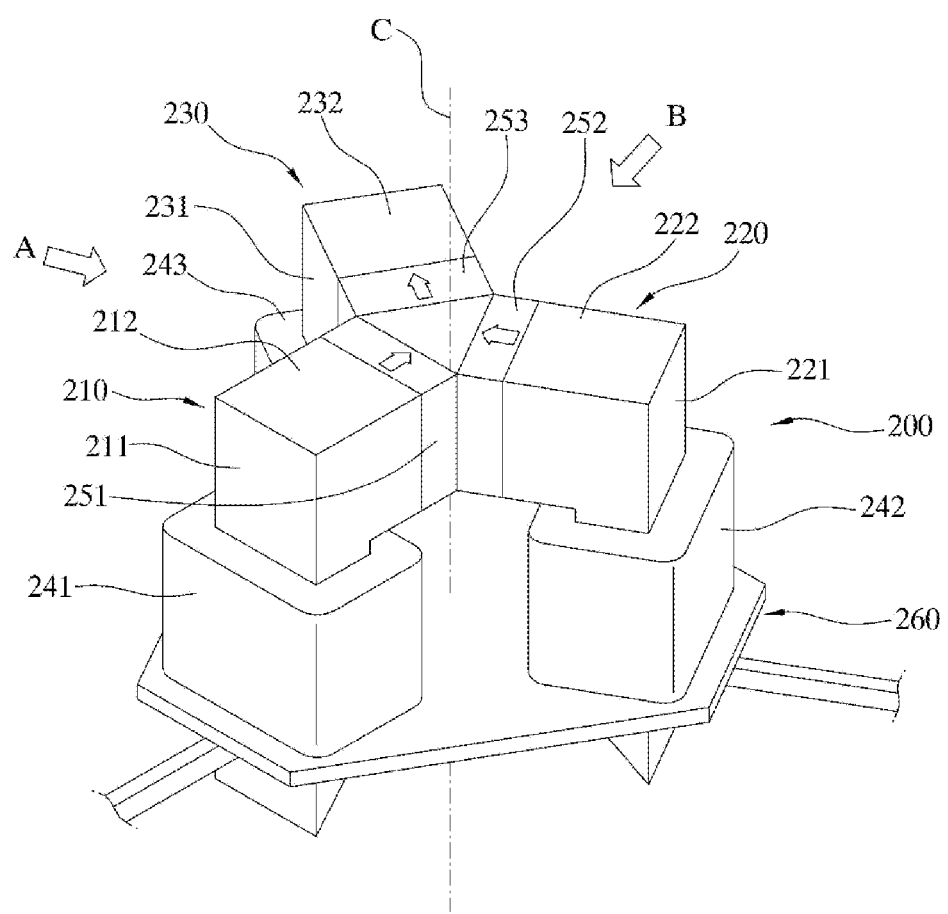
FIG. 8 is a perspective view for illustrating an actuator according to a second embodiment of the present disclosure and a multi-degrees of freedom magnetic levitation system using the same.
Figure 9:
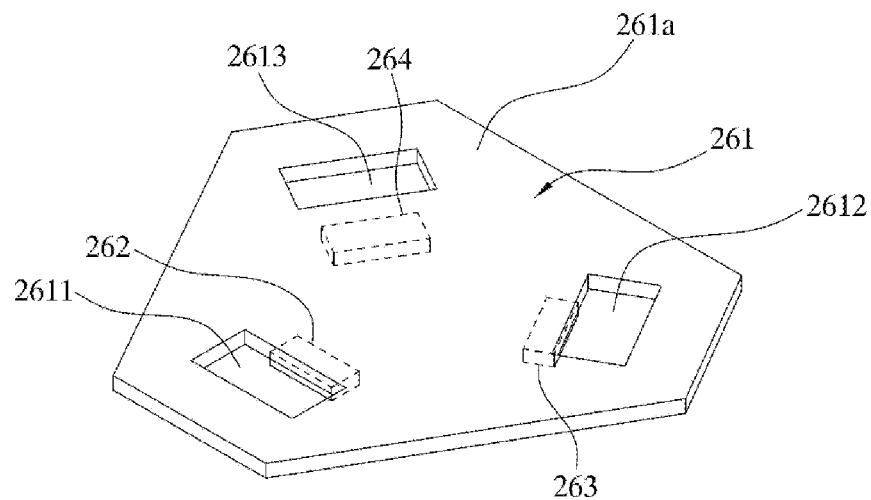
FIG. 9 is a perspective view for illustrating a configuration of a sensor module shown in FIG. 8.

FIG. 8 is a perspective view for illustrating an actuator according to a second embodiment of the present disclosure and a multi-degrees of freedom magnetic levitation system using the same. FIG. 9 is a perspective view illustrating a configuration of a sensor module shown in FIG. 8. FIG. 10 to FIG. 14 are diagrams for illustrating a process in which the multi-degrees of freedom magnetic levitation system using the actuator according to the second embodiment of the present disclosure controls a position of a magnetically-levitated object.

In FIG. 10 to FIG. 14, (a) is a view of FIG. 8 in an A direction, and (b) is a view of FIG. 8 in a B direction.

Referring to FIG. 8 and FIG. 9, an actuator 200 according to the second embodiment of the present disclosure may include a first iron core 210, a second iron core 220, a third iron core 230, a first winding 241, a second winding 242, a third winding 243, a first permanent magnet 251, a second permanent magnet 252 and a third permanent magnet 253.

The first iron core 210 includes a first pole 211 extending in the first direction and a second pole 212 extending in a second direction perpendicular to the first direction from one side end of the first pole 211. This first iron core 210 has a 'L' shape.

The first iron core 210 is disposed at the first azimuth around an imaginary axial line C parallel to the first direction. In this regard, the first pole 211 extends in a parallel manner to the gravitational direction.

The second iron core 220 includes a third pole 221 extending in a parallel manner to the extension direction of the first pole 211 and a fourth pole 222 that extends in the second direction from one side end of the third pole 221, wherein an end face of the fourth pole faces the axial line C. This second iron core 220 has a 'L' shape.

The second iron core 220 is disposed at a second azimuth around the axial line C and is adjacent to the first iron core 210. In this case, the third pole 221 extends in a parallel manner to the direction of gravity.

The third iron core 230 includes a fifth pole 231 extending in a parallel manner to the extension direction of the first pole 211 and a sixth pole 232 extending in the second direction from one side end of the fifth pole 231 and having an end face facing the axial line C. This third iron core 230 has a 'L' shape.

The third iron core 230 is disposed at a third azimuth around the axial line C and is adjacent to the first iron core 210 and the second iron core 220. In this regard, the fifth pole 231 extends in a parallel manner to the direction of gravity.

The first winding 241 is composed of a coil wound around the first pole 211 so as to surround the first pole 211.

The second winding 242 is composed of a coil wound around the third pole 221 to surround the third pole 221.

The third winding 243 is composed of a coil wound on the fifth pole 231 to surround the fifth pole 231.

A first permanent magnet 251 is fixed to the end face of the second pole 212 so that a magnetic flux thereof is directed toward the axial line C. The first permanent magnet 251 may include a first pole and a second pole, and the first pole may be an S pole and the second pole may be an N pole. The first pole may be in contact with the end face of the second pole 212.

A second permanent magnet 252 is fixed to the end face of the fourth pole 222 so that a magnetic flux thereof is directed toward the axial line C. The second permanent magnet 252 may include a first pole and a second pole, and the first pole may be an S pole and the second pole may be an N pole. The first pole may be in contact with the end face of the fourth pole 222.

The third permanent magnet 253 is fixed to the end face of the sixth pole so that a magnetic flux thereof is directed toward the end face of the sixth pole. The third permanent magnet 253 may include a first pole and a second pole, and the first pole may be an S pole and the second pole may be an N pole. The second pole may be in contact with the end face of the sixth pole 232.

In one example, a lower end of each of the first pole 211, the third pole 221, and the fifth pole 231 may have an inclined face facing an inner space therebetween.

Referring to FIG. 8 and FIG. 9, the multi-degrees of freedom magnetic levitation system according to the second embodiment of the present disclosure may include the actuator 200 according to the second embodiment and a sensor module 260.

Since the configuration of the actuator 200 has been described in detail above, a detailed description thereof will be omitted.

The sensor module 260 may include an adapter 261; and a first optical-fiber sensor 262, a second optical-fiber sensor 263, and a third optical-fiber sensor 264 disposed under the first to third windings 241, 242, and 243 of the actuator 200, respectively.

The adapter 261 may include a top plate 261*a* having a first core receiving hole 2611 defined therein into which the first pole 211 is inserted, a second core receiving hole 2612 defined therein into which the third pole 221 is inserted, and a third core receiving hole 2613 defined therein into which the fifth pole 231 is inserted.

The first optical-fiber sensor 262 may be positioned under the first winding 241, the second optical-fiber sensor 263 may be positioned under the second winding 242, and the third optical-fiber sensor 264 may be positioned under the third winding 243.

To this end, the first optical-fiber sensor 262 may be fixed to a bottom face of the top plate 261*a* of the adapter 261 so as to be positioned inwardly of the first pole 211. The second optical-fiber sensor 263 may be fixed to the bottom face of the top plate 261*a* of the adapter 261 so as to be positioned inwardly of the third pole 221. The third optical-fiber sensor 264 may be fixed to the bottom face of the top plate 261*a* of the adapter 261 so as to be positioned inwardly of the fifth pole 231.

The first optical-fiber sensor 262, the second optical-fiber sensor 263, and the third optical-fiber sensor 264 may measure the magnetically-levitated object 10 positioned between the first iron core 210, the second iron core 220, and the third iron core 230, and may transmit the measured position information to the controller (not shown) of the multi-degrees of freedom magnetic levitation system.

Further, the multi-degrees of freedom magnetic levitation system according to the second embodiment of the present disclosure may apply a current to each of the first winding 241 the second winding 242 and the third winding 243 to control the position of the magnetically-levitated object 10, based on the position information of the magnetically-levitated object 10 measured using the first optical-fiber sensor 262, the second optical-fiber sensor 263, and the third optical-fiber sensor 264.

Figure 10:
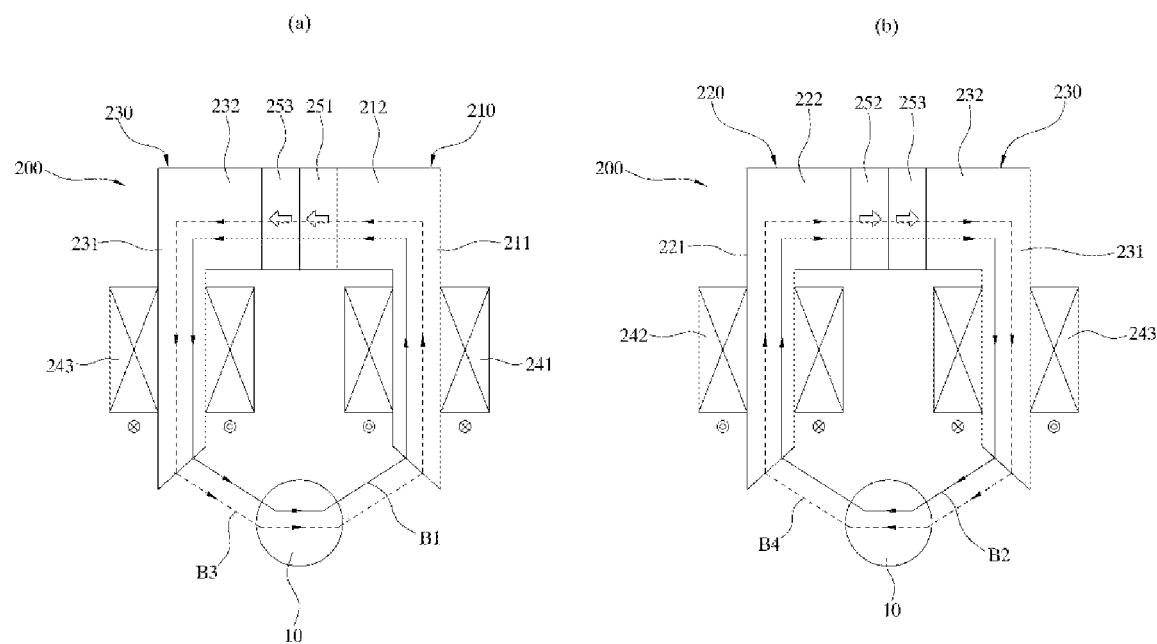
FIG. 10 to FIG. 14 are diagrams for illustrating a process in which the multi-degrees of freedom magnetic levitation system using the actuator according to the second embodiment of the present disclosure controls a position of a magnetically-levitated object.

As shown in FIG. 10, in the multi-degrees of freedom magnetic levitation system according to the second embodiment of the present disclosure, the first permanent magnet 251 and the third permanent magnet 253 may generate a first magnetic field B1 along a shape of a combination of the first iron core 210 and the third iron core 230, and the second permanent magnet 252 and the third permanent magnet 253 may generate a second magnetic field B2 along a shape of a combination of the second iron core 220 and the third iron core 230. In this regard, attractive forces acting between the magnetically-levitated object 10 and the first iron core 210, the second iron core 220, and the third iron core 230 are equal to each other. Accordingly, when the magnetically-levitated object 10 is positioned between the first pole 211 of the first iron core 210, the third pole 221 of the second iron core 220, and the fifth pole 231 of the third iron core 230, the magnetically-levitated object 10 may be levitated under the first magnetic field B1 and the second magnetic field B2. In this regard, the inner face of each of the first pole 211, the third pole 221, and the fifth pole 231 may be inclined, so that the magnetic fluxes acting between the first iron core 210, the second iron core 220, the third iron core 230 and the magnetically-levitated object 10 may be easily concentrated.

The multi-degrees of freedom magnetic levitation system according to the second embodiment of the present disclosure may adjust a direction and an intensity of the current independently applied to each of the first winding 241, the second winding 242 and the third winding 243 to control the position of the magnetically-levitated object 10 in each of the Z-axis, X-axis and Y-axis directions.

The Z-axis may be parallel to the axial line C, the X-axis may be parallel to the first azimuth, and the Y-axis may include a component Y1 intersecting the X-axis and a component Y2 intersecting the X-axis, and, wherein the component Y1 may be an axis parallel to the second azimuth, and the component Y2 may be an axis parallel to the third azimuth.

When the system intends to move the magnetically-levitated object 10 in the +Z direction, the system may independently apply the current to each of the first winding 241, the second winding 242 and the third winding 243 such that a third magnetic field B3 is induced in the same direction as a direction of the first magnetic field B1, and a fourth magnetic field B4 is induced in the same direction as a direction of the second magnetic field B2, as shown in FIG. 10, such that a total magnetic field intensity increases. Thus, the levitation force acting on the magnetically-levitated object 10 in the +Z direction increases, so that the magnetically-levitated object 10 may move in the +Z direction.

Figure 11:
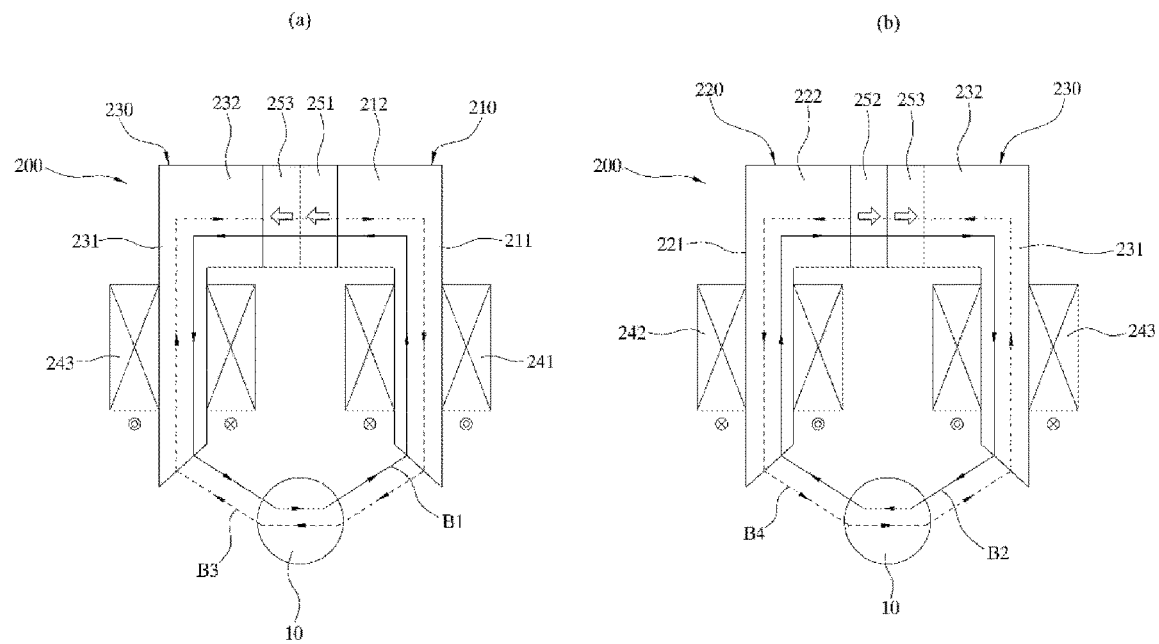

When the system intends to move the magnetically-levitated object 10 in the −Z direction, the system may independently apply the current to each of the first winding 241, the second winding 242 and the third winding 243 so that the third magnetic field B3 is induced in the opposite direction to a direction of the first magnetic field B1 and the fourth magnetic field B4 is induced in the opposite direction to a direction of the second magnetic field B2, as shown in FIG. 11, thereby moving the magnetically-levitated object 10 in the −Z direction.

Figure 12:
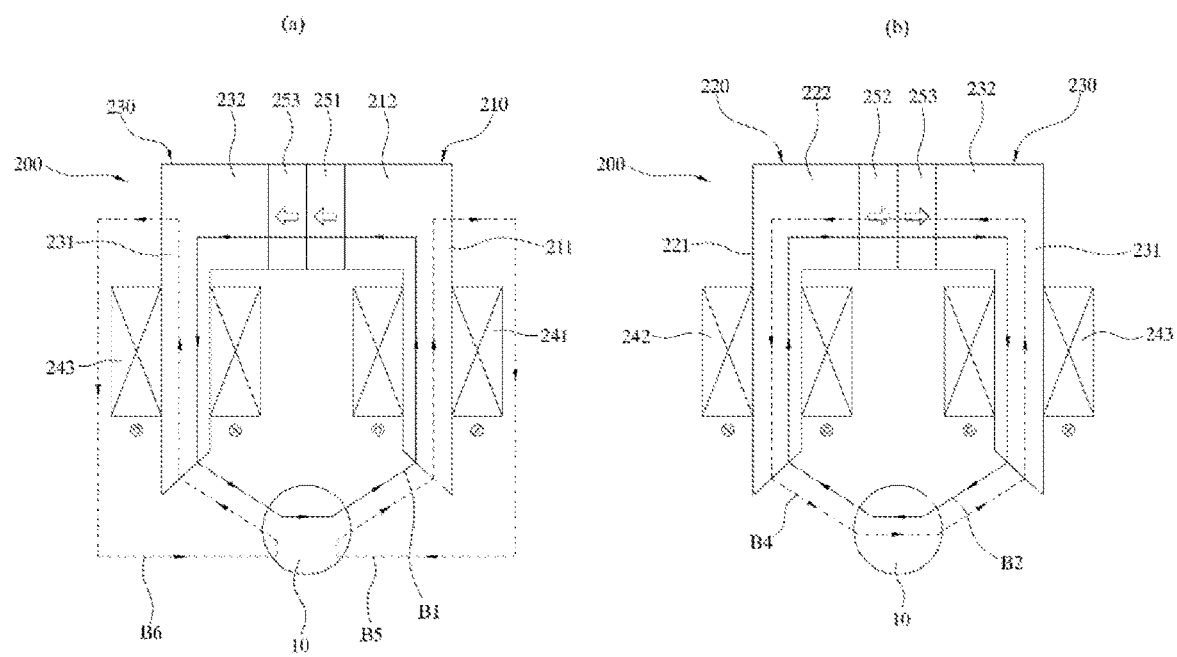

When the system intends to move the magnetically-levitated object 10 in the X direction, the system may independently apply the current to each of the first winding 241, the second winding 242 and the third winding 243 so that, as shown in FIG. 12, a fifth magnetic field B5 generated between the first iron core 210 and the magnetically-levitated object 10 is induced in the same direction as a direction of the first magnetic field B1, a sixth magnetic field B6 generated between the third iron core 230 and the magnetically-levitated object 10 is induced in a direction opposite to that of the first magnetic field B1, and a fourth magnetic field B4 generated between the magnetically-levitated object 10 and the second iron core 220 and the third iron core 230 is induced in a direction opposite to that of the second magnetic field B2, thereby moving the magnetically-levitated object 10 in the X direction.

Figure 13:
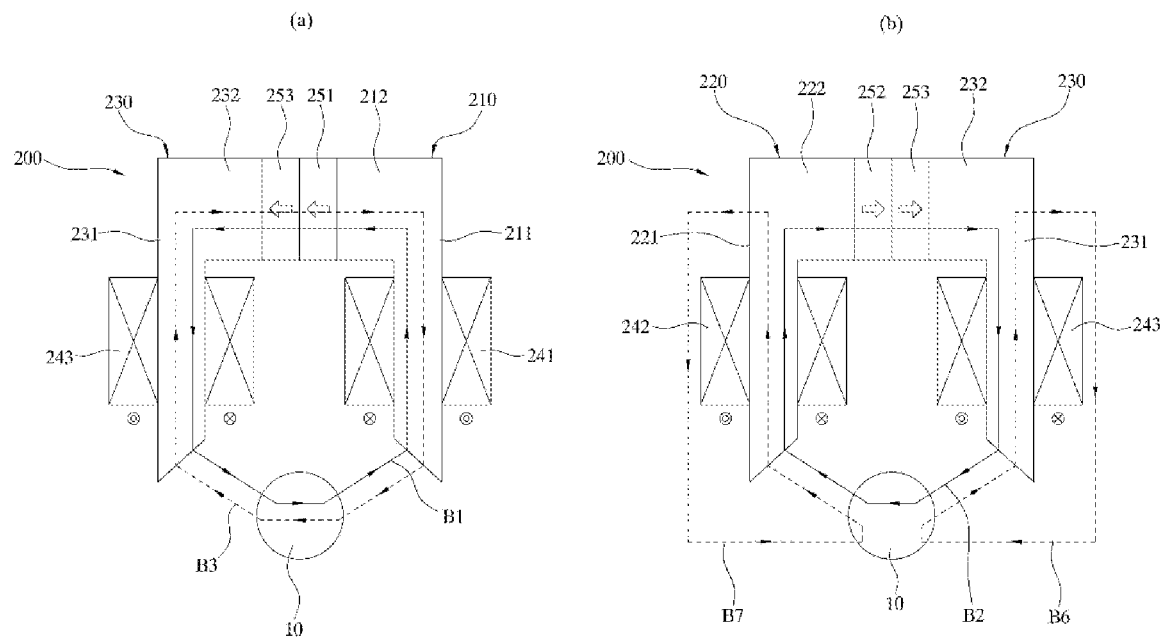

When the system intends to move the magnetically-levitated object 10 in the Y1 direction, the system may independently apply the current to each of the first winding 241, the second winding 242 and the third winding 243 so that, as shown in FIG. 13, the third magnetic field B3 is induced in the opposite direction to a direction of the first magnetic field B1, a seventh magnetic field B7 generated between the second iron core 220 and the magnetically-levitated object 10 is induced in the same direction as a direction of the second magnetic field B2, and the sixth magnetic field B6 generated between the third iron core 230 and the magnetically-levitated object 10 is induced in the opposite direction to a direction of the second magnetic field B2, thereby moving the magnetically-levitated object 10 in the Y1 direction.

Figure 14:
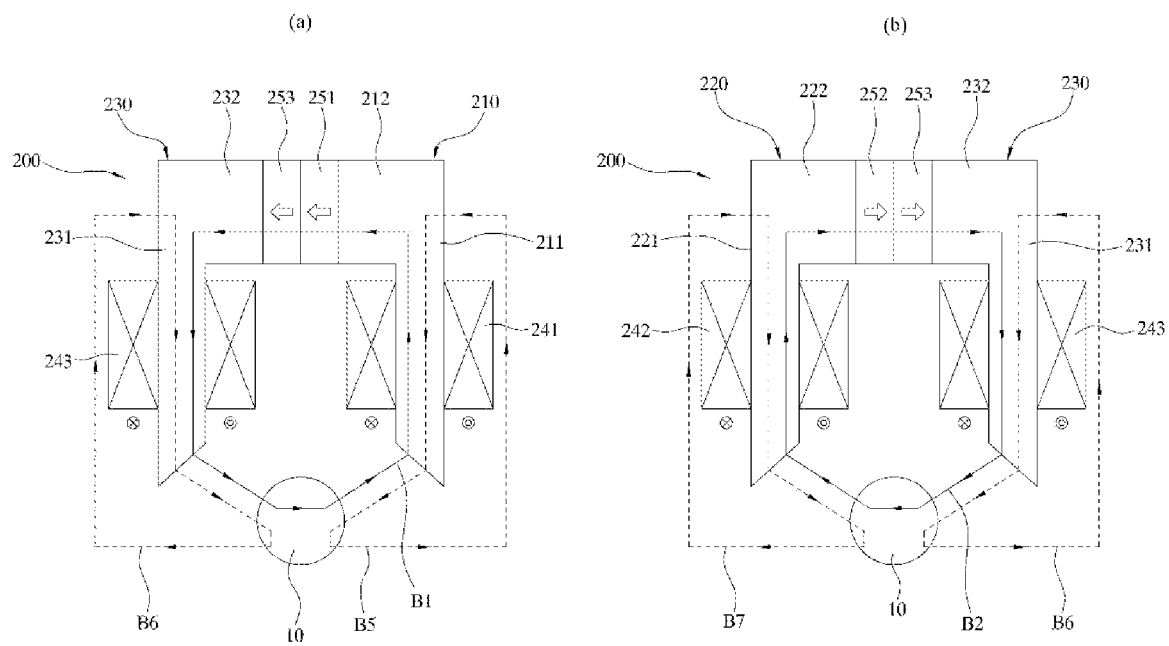

When the system intends to move the magnetically-levitated object 10 in the Y2 direction, the system may independently apply the current to each of the first winding 241, the second winding 242, and the third winding 243 so that, as shown in FIG. 14, the fifth magnetic field B5 generated between the first iron core 210 and the magnetically-levitated object 10 is induced in the opposite direction to a direction of the first magnetic field B1, the seventh magnetic field B7 generated between the second iron core 220 and the magnetically-levitated object 10 is induced in the opposite direction to a direction of the second magnetic field B2, and the sixth magnetic field B6 generated between the third iron core 230 and the magnetically-levitated object 10 is induced in the same direction as a direction of the second magnetic field B2, thereby moving the magnetically-levitated object 10 in the Y2 direction.

Figure 15:
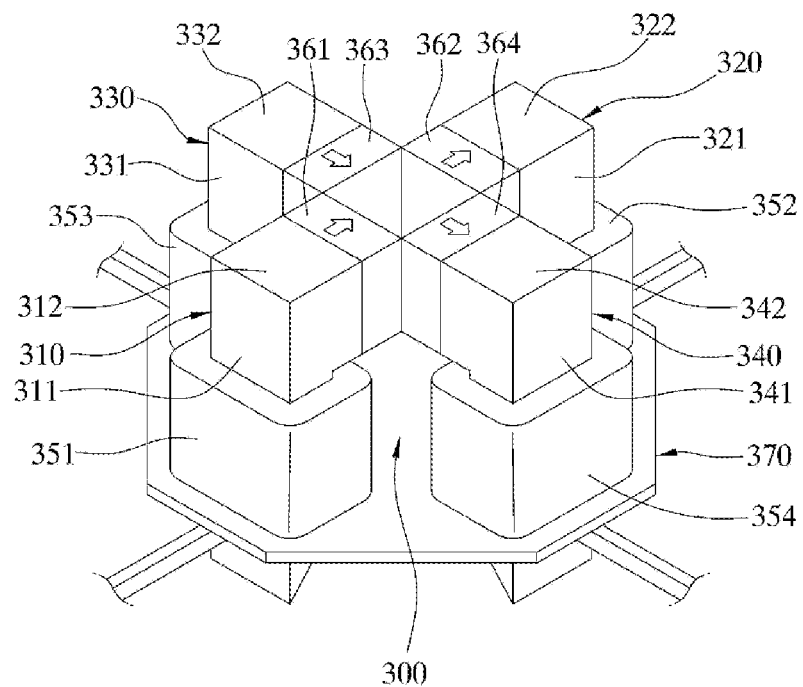
FIG. 15 is a perspective view for illustrating an actuator according to a third embodiment of the present disclosure and a multi-degrees of freedom magnetic levitation system using the same.
Figure 16:
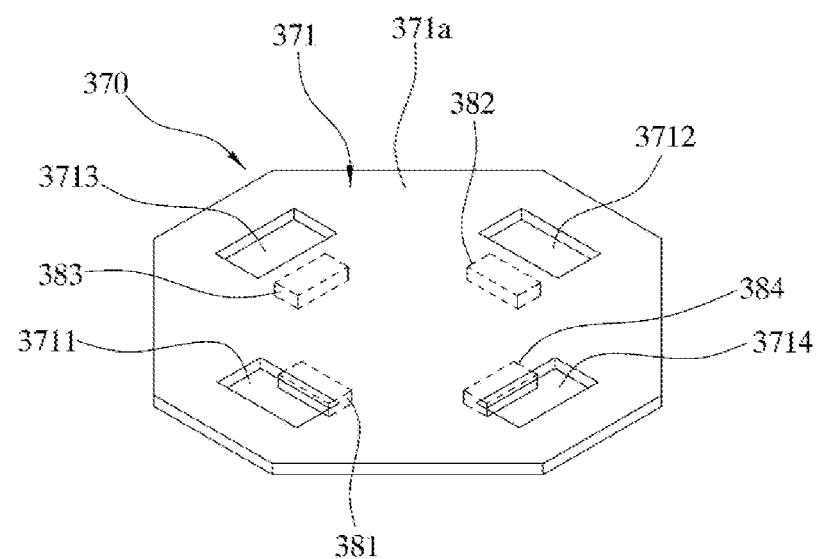
FIG. 16 is a perspective view for illustrating a configuration of a sensor module shown in FIG. 15.

FIG. 15 is a perspective view for illustrating an actuator according to a third embodiment of the present disclosure and a multi-degrees of freedom magnetic levitation system using the same. FIG. 16 is a perspective view illustrating a configuration of a sensor module shown in FIG. 15. FIG. 17 to FIG. 22 are diagrams for illustrating a process in which the multi-degrees of freedom magnetic levitation system using the actuator according to the third embodiment of the present disclosure controls a position of a magnetically-levitated object.

In FIG. 17 to FIG. 22, (a) shows a state in which a first iron core 310 and a second iron core 320 shown in FIG. 15 face each other, and (b) shows a state in which a third iron core 330 and a fourth iron core 340 shown in FIG. 15 face each other.

Referring to FIG. 15 and FIG. 16, the actuator according to the third embodiment of the present disclosure may include the first iron core 310, the second iron core 320, the third iron core 330, the fourth iron core 340, a first winding 351, a second winding 352, a third winding 353, a fourth winding 354, a first permanent magnet 361, a second permanent magnet 362, a third permanent magnet 363, and a fourth permanent magnet 364.

The first iron core 310 includes a first pole 311 extending in the first direction and a second pole 312 extending in a second direction perpendicular to the first direction from one side end of the first pole 311. This first iron core 310 has a 'L' shape.

The second iron core 320 includes a third pole 321 extending in a parallel manner to the extension direction of the first pole, and a fourth pole 322 extending in a parallel manner to the extension direction of the second pole 312 from one side end of the third pole 321 and having an end face facing an end face of the second pole 312. This second iron core 320 has a 'L' shape.

The third iron core 330 includes a fifth pole 331 extending in a parallel manner to the extension direction of the first pole 311, and a sixth pole 332 extending in the second direction from one side end of the fifth pole 331. The third iron core 330 is adjacent to the first iron core 310 and the second iron core 320 such that an angle defined between an end face of the sixth pole 332 and each of the end face of the second pole 312 and the end face of the fourth pole 322 is a right angle. This third iron core 330 has a 'L' shape.

The fourth iron core 340 includes a seventh pole 341 extending in a parallel manner to the extension direction of the first pole 311, and an eighth pole 342 extending in parallel manner to the extension direction of the sixth pole 332 from one side end of the seventh pole 341, and having an end face facing the end face of the sixth pole 332. This fourth iron core 340 has a 'L' shape.

The first winding 351 is composed of a coil wound around the first pole 311 so as to surround the first pole 311.

The second winding 352 is composed of a coil wound around the third pole 321 to surround the third pole 321.

The third winding 353 is composed of a coil wound around the fifth pole 331 to surround the fifth pole 331.

The fourth winding 354 is composed of a coil wound around the seventh pole 341 to surround the seventh pole 341.

The first permanent magnet 361 is fixed to the end face of the second pole 312 so that a magnetic flux thereof is directed toward the end face of the fourth pole 322 facing the end face of the second pole 312.

The second permanent magnet 362 is fixed to the end face of the fourth pole 322 so that a magnetic flux thereof is directed toward the end face of the fourth pole 322.

The third permanent magnet 363 is fixed to the end face of the sixth pole 332 such that a magnetic flux thereof is directed toward the end face of the eighth pole 342 facing the end face of the sixth pole 332.

The fourth permanent magnet 364 is fixed to the end face of the eighth pole 342 so that a magnetic flux thereof is directed toward the end face of the eighth pole 342.

In one example, a lower end of each of the first pole 311, the third pole 321, the fifth pole 331 and the seventh pole 341 may have an inclined face facing an inner space therebetween.

Referring to FIG. 15 and FIG. 16, the multi-degrees of freedom magnetic levitation system according to the third embodiment of the present disclosure may include the actuator 300 according to the third embodiment and a sensor module 370.

Since a configuration of the actuator 300 has been described in detail above, a detailed description thereof will be omitted.

The sensor module 370 may include an adapter 371; and a first optical-fiber sensor 381, a second optical-fiber sensor 382, a third optical fiber sensor 383, and a fourth optical-fiber sensor 384 disposed under the first to fourth windings 351, 352, 353, and 354 of the actuator 300, respectively.

The adapter 371 includes a top plate 371a having a first core receiving hole 3711 defined therein into which the first pole 311 is inserted, a second core receiving hole 3712 defined therein into which the third pole 321 is inserted, a third core receiving hole 3713 defined therein into which the fifth pole 331 is inserted, and a fourth core receiving hole 3714 defined therein into which the seventh pole 341 is inserted.

The first optical-fiber sensor 381 may be positioned under the first winding 351. The second optical-fiber sensor 382 may be positioned under the second winding 352. The third optical-fiber sensor 383 may be positioned under the third winding 353. The fourth optical-fiber sensor 384 may be positioned under the fourth winding 354.

To this end, the first optical-fiber sensor 381 may be fixed to a bottom face of the top plate 371a of the adapter 371 so as to be positioned inwardly of the first pole 311. The second optical-fiber sensor 382 may be fixed to the bottom face of the top plate 371a of the adapter 371 so as to be positioned inwardly of the third pole 321. The third optical-fiber sensor 383 may be fixed to the bottom face of the top plate 371a of the adapter 371 so as to be positioned inwardly of the fifth pole 331. The fourth optical-fiber sensor 384 may be fixed to the bottom face of the top plate 371a of the adapter 371 so as to be positioned inwardly of the seventh pole 341.

The first optical-fiber sensor 381, the second optical-fiber sensor 382, the third optical-fiber sensor 383, and the fourth optical-fiber sensor 384 may measure a position of the magnetically-levitated object 10 positioned between the first iron core 310, the second iron core 320, the third iron core 330 and the fourth iron core 340, and may transmit the measured position information to a controller (not shown) of the multi-degrees of freedom magnetic levitation system.

Further, the multi-degrees of freedom magnetic levitation system according to the third embodiment of the present disclosure may be configured to control the position of the magnetically-levitated object 10 by applying a current to each of the first winding 351, the second winding 352, the third winding 353 and the fourth winding 354, based on the position information of the magnetically-levitated object 10 measured using the first optical-fiber sensor 381, the second optical-fiber sensor 382, the third optical-fiber sensor 383, and the fourth optical-fiber sensor 384.

Figure 17:
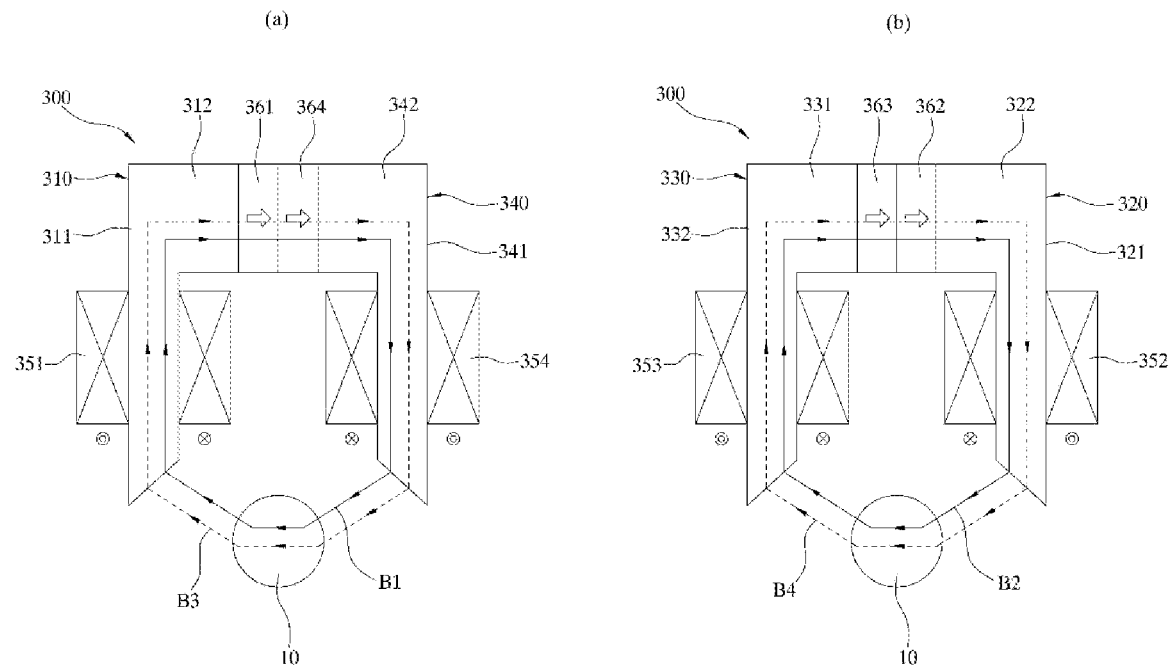
FIG. 17 to FIG. 22 are diagrams for illustrating a process in which the multi-degrees of freedom magnetic levitation system using the actuator according to the third embodiment of the present disclosure controls a position of a magnetically-levitated object.

As shown in FIG. 17, in the multi-degrees of freedom magnetic levitation system according to the third embodiment of the present disclosure, the first permanent magnet 361 and the fourth permanent magnet 364 may generate a first magnetic field B1 along a shape of a combination of the first iron core 310 and the fourth iron core 340, and the third permanent magnet 363 and the second permanent magnet 362 may generate a second magnetic field B2 along a shape of a combination of the third iron core 330 and the second iron core 320. In this regard, attractive forces acting between the magnetically-levitated object 10 and the first iron core 310, the second iron core 320, the third iron core 330, and the fourth iron core 340 are equal to each other. Accordingly, when the magnetically-levitated object 10 is positioned between the first pole 311 of the first iron core 310, the third pole 321 of the second iron core 320, the fifth pole 331 of the third iron core 330, and the seventh pole 341 of the fourth iron core 340, the magnetically-levitated object 10 may be levitated under the first magnetic field B1 and the second magnetic field B2. In this regard, magnetic fluxes acting between the first iron core 310, the second iron core 320, the third iron core 330, the fourth iron core 340 and the magnetically-levitated object 10 may be easily concentrated because the lower end of each of the first pole 311, the third pole 321, the fifth pole 331 and the seventh pole 341 has the inclined face facing an inner space therebetween.

The multi-degrees of freedom magnetic levitation system according to the third embodiment of the present disclosure may adjust a direction and an intensity of the current independently applied to each of the first winding 351, the second winding 352, the third winding 353 and the fourth winding 354 to control the position of the magnetically-levitated object 10 in each of the Z-axis, X-axis, and Y-axis directions.

When the system intends to move the magnetically-levitated object 10 in the +Z direction, the system may independently apply the current to each of the first winding 351, the second winding 352, the third winding 353 and the fourth winding 354 so that, as shown in FIG. 17, a third magnetic field B3 is induced in the same direction as a direction of the first magnetic field B1, and a fourth magnetic field B4 is induced in the same direction as a direction of the second magnetic field B2. Thus, a total magnetic field intensity increases, such that the levitation force acting on the magnetically-levitated object 10 in the +Z direction increases, so that the magnetically-levitated object 10 may move in the +Z direction.

Figure 18:
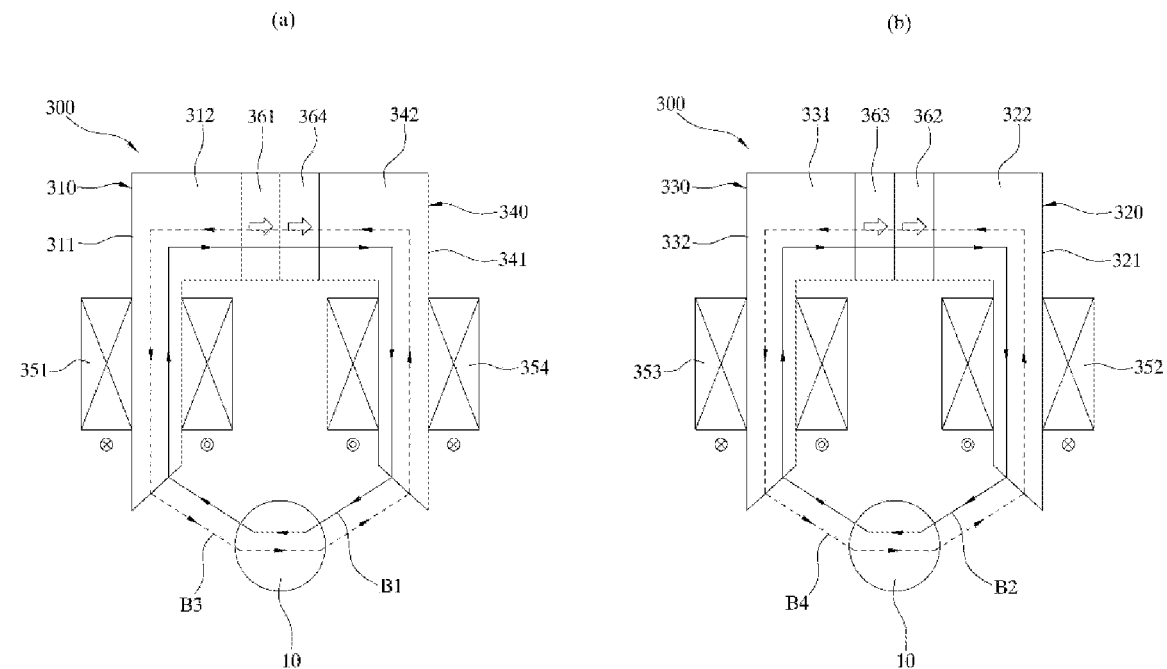

When the system intends to move the magnetically-levitated object 10 in the −Z direction, the system may independently apply the current to each of the first winding 351, the second winding 352, the third winding 353 and the fourth winding 354 so that, as shown in FIG. 18, the third magnetic field B3 is induced in a direction opposite to that of the first magnetic field B1 and the fourth magnetic field B4 is induced in the opposite direction to a direction of the second magnetic field B2. Thus, the levitation force is reduced, thereby moving the magnetically-levitated object 10 in the −Z direction.

Figure 19:
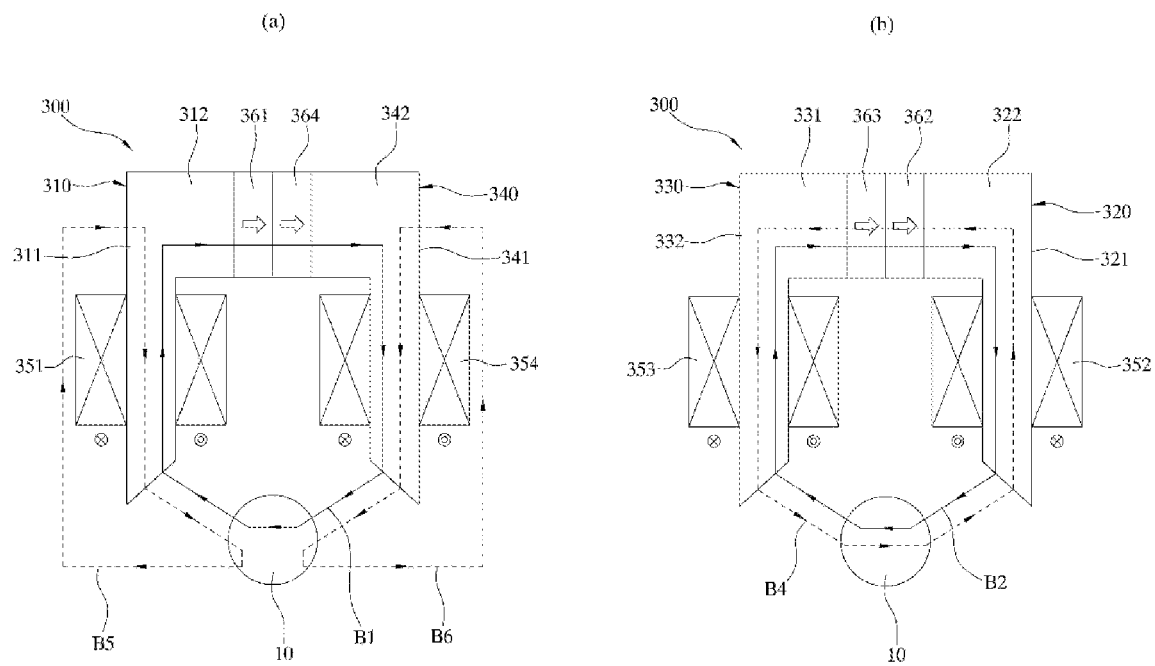

When the system intends to move the magnetically-levitated object 10 in the +X direction, the system may independently apply the current to each of the first winding 351, the second winding 352, the third winding 353 and the fourth winding 354 so that, as shown in FIG. 19, a fifth magnetic field B5 generated between the first iron core 310 and the magnetically-levitated object 10 is induced in the opposite direction to a direction of the first magnetic field B1, a sixth magnetic field B6 generated between the fourth iron core 340 and the magnetically-levitated object 10 is induced in the same direction as a direction of the first magnetic field B1, and the fourth magnetic field B4 is induced in the opposite direction to that of the second magnetic field B2, thereby moving the magnetically-levitated object 10 in the +X direction.

Figure 20:
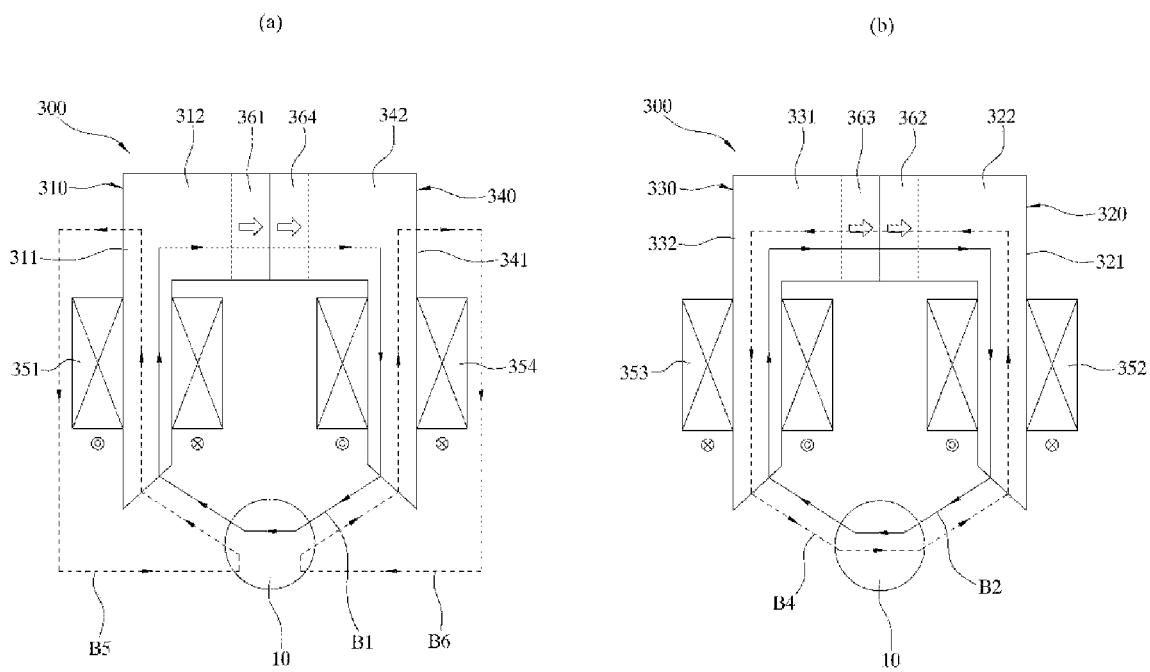

When the system intends to move the magnetically-levitated object 10 in the −X direction, the system may independently apply the current to each of the first winding 351, the second winding 352, the third winding 353 and the fourth winding 354 so that, as shown in FIG. 20, the fifth magnetic field B5 generated between the first iron core 310 and the magnetically-levitated object 10 is induced in the same direction as a direction of the first magnetic field B1, the sixth magnetic field B6 generated between the fourth iron core 340 and the magnetically-levitated object 10 is induced in the opposite direction to a direction of the first magnetic field B1, and the fourth magnetic field B4 is induced in the opposite direction to a direction of the second magnetic field B2, thereby moving the magnetically-levitated object 10 in the −X direction.

Figure 21:
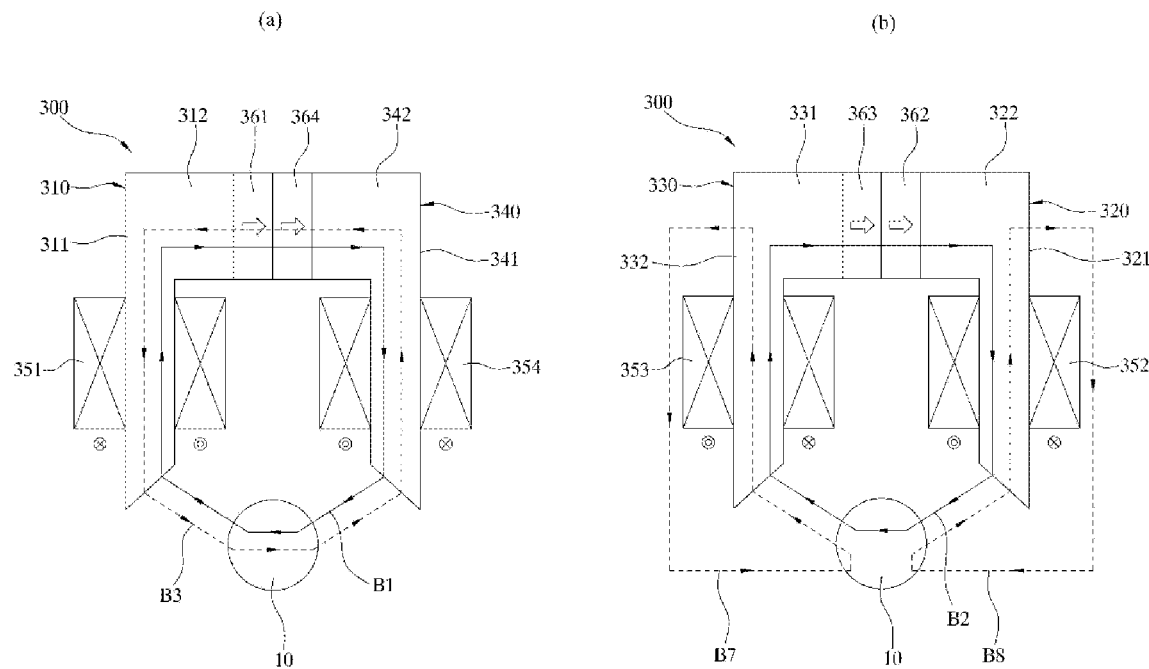

When the system intends to move the magnetically-levitated object 10 in the +Y direction, the system may independently apply the current to each of the first winding 351, the second winding 352, the third winding 353 and the fourth winding 354 so that, as shown in FIG. 21, a seventh magnetic field B7 generated between the third iron core 330 and the magnetically-levitated object 10 is induced in the same direction as a direction of the second magnetic field B2, an eighth magnetic field B8 generated between the second iron core 320 and the magnetically-levitated object 10 is induced in the opposite direction to a direction of the second magnetic field B2, and the third magnetic field B3 is induced in the opposite direction to a direction of the first magnetic field B1, thereby moving the magnetically-levitated object 10 in the +Y direction.

Figure 22:
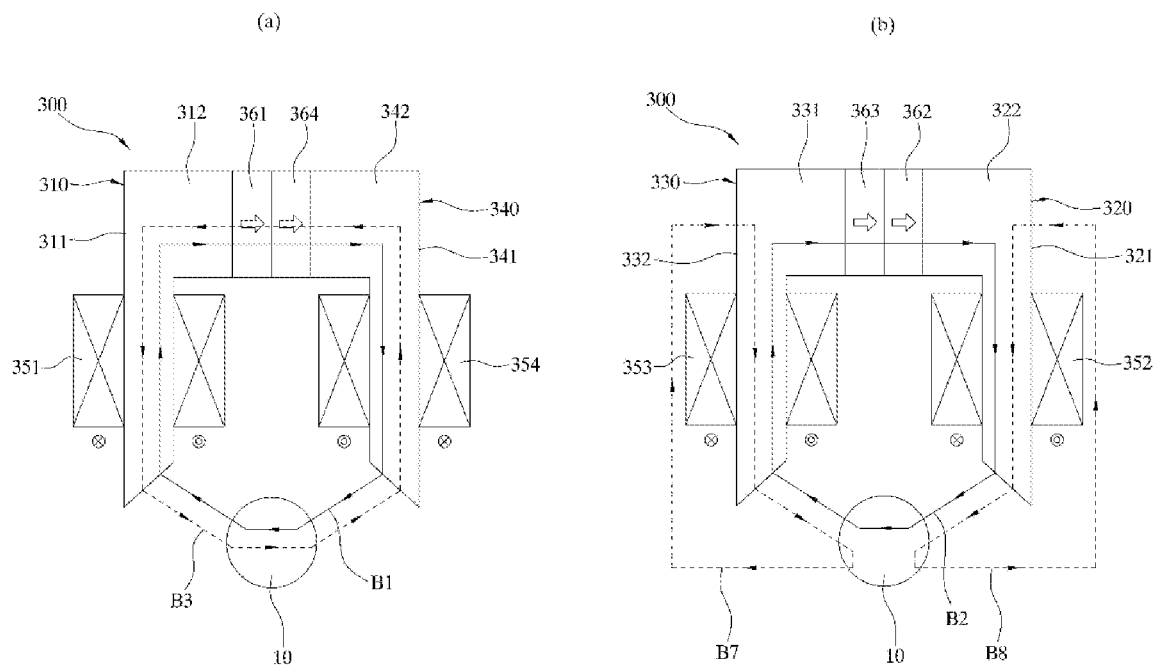

When the system intends to move the magnetically-levitated object 10 in the −Y direction, the system may independently apply the current to each of the first winding 351, the second winding 352, the third winding 353 and the fourth winding 354 so that, as shown in FIG. 22, the eighth magnetic field B8 generated between the second iron core 320 and the magnetically-levitated object 10 is induced in the same direction as a direction of the second magnetic field B2, the seventh magnetic field B7 is induced in a direction opposite to that of the second magnetic field B2, and the third magnetic field B3 is induced in the opposite direction to a direction of the first magnetic field B1, thereby moving the magnetically-levitated object 10 in the −Y direction.

Figure 23:
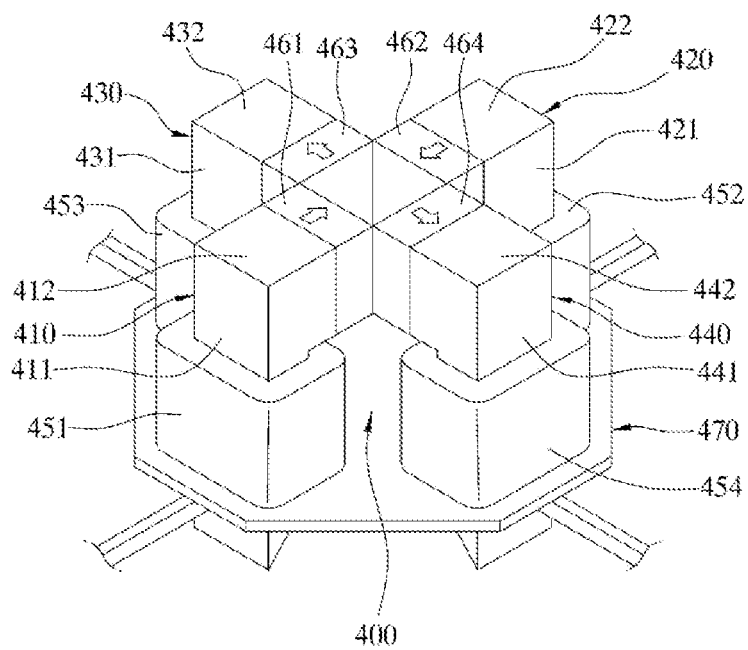
FIG. 23 is a perspective view for illustrating an actuator according to a fourth embodiment of the present disclosure and a multi-degrees of freedom magnetic levitation system using the same.

FIG. 23 is a perspective view for illustrating an actuator according to a fourth embodiment of the present disclosure and a multi-degrees of freedom magnetic levitation system using the same. FIG. 24 to FIG. 29 are diagrams for illustrating a process in which the multi-degrees of freedom magnetic levitation system using the actuator according to the fourth embodiment of the present disclosure controls a position of a magnetically-levitated object.

In FIG. 24 to FIG. 29, (a) shows a state in which a first iron core 410 and a fourth iron core 440 shown in FIG. 23 face each other, and (b) shows a state in which a second iron core 420 and a third iron core 430 shown in FIG. 23 face each other.

Referring to FIG. 23, the actuator according to the fourth embodiment of the present disclosure may include the first iron core 410, the second iron core 420, the third iron core 430, the fourth iron core 440, a first winding 451, a second winding 452, a third winding 453, a fourth winding 454, a first permanent magnet 461, a second permanent magnet 462, a third permanent magnet 463, and a fourth permanent magnet 464.

The first iron core 410, the second iron core 420, the third iron core 430, the fourth iron core 440, the first winding 451, the second winding 452, the third winding 453, and the fourth winding 454 are respectively identical with the first iron core 410, the second iron core 420, the third iron core 430, the fourth iron core 440, the first winding 451, the second winding 452, the third winding 453, and the fourth winding 454 of the actuator 400 according to the third embodiment of the present disclosure. Thus, a detailed description thereof will be omitted.

The first permanent magnet 461 is fixed to the end face of the second pole 412 so that a magnetic flux thereof is directed toward the end face of the fourth pole 422 of the second iron core 420 facing the end face of the second pole of the first iron core 410.

The second permanent magnet 462 is fixed to the end face of the fourth pole 422 so that a magnetic flux thereof is directed toward the end face of the second pole 412.

The third permanent magnet 463 is fixed to the end face of the sixth pole 432 such that a magnetic flux thereof is directed toward the end face of the sixth pole 432 of the third iron core 430.

The fourth permanent magnet 464 is fixed to the end face of the eighth pole 442 such that a magnetic flux thereof is directed toward the end face of the eighth pole 442 of the fourth iron core 440.

Referring to FIG. 23, the multi-degrees of freedom magnetic levitation system according to the fourth embodiment of the present disclosure may include the actuator 400 according to the fourth embodiment and a sensor module 470.

Since a configuration of the actuator 400 has been described in detail above, a detailed description thereof will be omitted.

Since the sensor module 470 is substantially the same as the sensor module 370 according to the third embodiment of the present disclosure, a detailed description thereof will be omitted.

Figure 24:
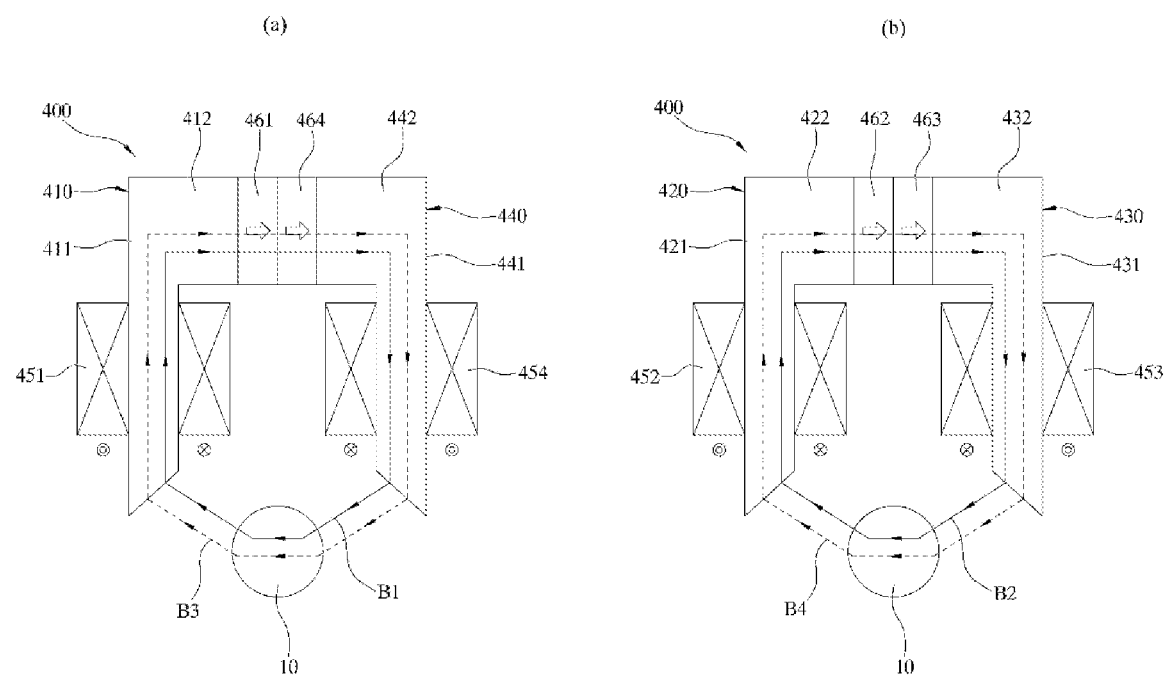
FIG. 24 to FIG. 29 are diagrams for illustrating a process in which the multi-degrees of freedom magnetic levitation system using the actuator according to the fourth embodiment of the present disclosure controls a position of a magnetically-levitated object.

As shown in FIG. 24, in the multi-degrees of freedom magnetic levitation system according to the fourth embodiment of the present disclosure, the first permanent magnet 461 and the fourth iron core 440 may generate a first magnetic field B1 along a shape of a combination of the first permanent magnet 461 and the fourth permanent magnet 464, and the second permanent magnet 462 and the third permanent magnet 463 may generate a second magnetic field B2 along a shape of a combination of the second iron core 420 and the third iron core 430. In this regard, attractive forces acting between the magnetically-levitated object 10 and the first iron core 410, the second iron core 420, the third iron core 430 and the fourth iron core 440 are equal to each other. Accordingly, when the magnetically-levitated object 10 is positioned between the first pole 411 of the first iron core 410, the third pole 421 of the second iron core 420, the fifth pole 431 of the third iron core 430, and the seventh pole 441 of the fourth iron core 440, the magnetically-levitated object 10 may be levitated under the first magnetic field B1 and the second magnetic field B2.

The multi-degrees of freedom magnetic levitation system according to the fourth embodiment of the present disclosure may adjust a direction and an intensity of the current independently applied to each of the first winding 451, the second winding 452, the third winding 453 and the fourth winding 454 to control a position of the magnetically-levitated object 10 in each of the Z-axis, X-axis, and Y-axis directions.

When the system intends to move the magnetically-levitated object 10 in the +Z direction, the system may independently apply the current to each of the first winding 451, the second winding 452, the third winding 453 and the fourth winding 453 so that, as shown in FIG. 24, a third magnetic field B3 is induced in the same direction as a direction of the first magnetic field B1 and a fourth magnetic field B4 is induced in the same direction as a direction of the second magnetic field B2. Thus, a total magnetic field intensity increases, such that the levitation force acting on the magnetically-levitated object 10 in the +Z direction increases to move the magnetically-levitated object 10 in the +Z direction.

Figure 25:
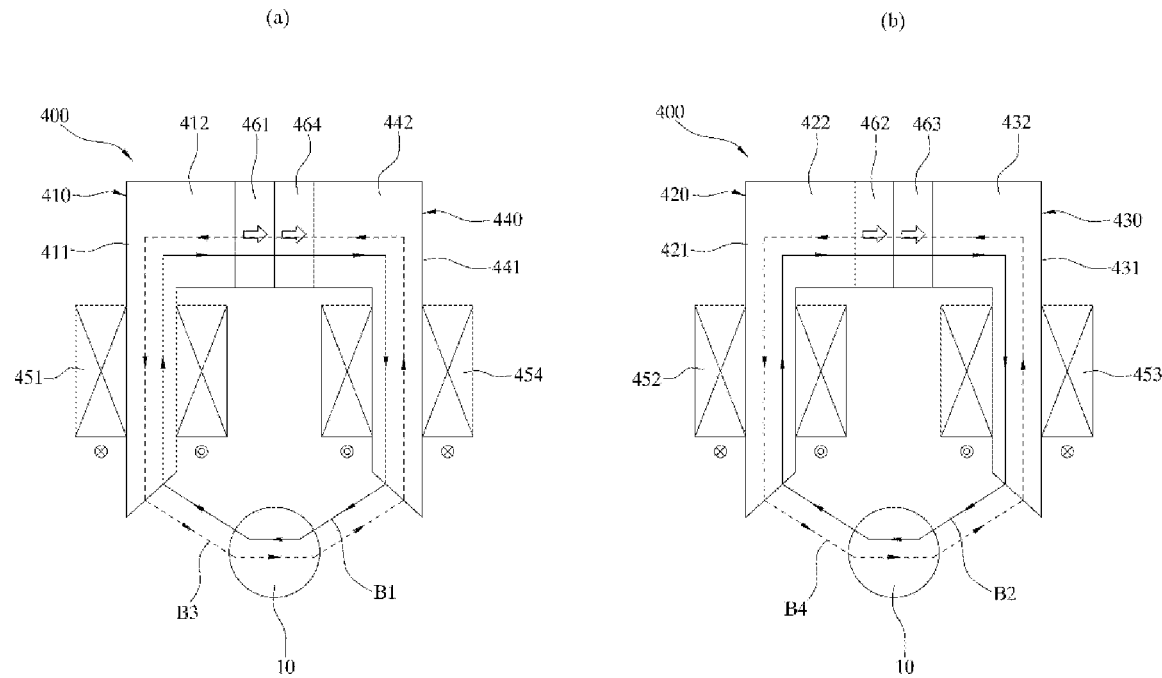

When the system intends to move the magnetically-levitated object 10 in the −Z direction, the system may independently apply the current to each of the first winding 451, the second winding 452, the third winding 453 and the fourth winding 453 so that, as shown in FIG. 25, the third magnetic field B3 is induced in the opposite direction to a direction of the first magnetic field B1 and the fourth magnetic field B4 is induced in the opposite direction to a direction of the second magnetic field B2. Thus, the levitation force is reduced, thereby moving the magnetically-levitated object 10 in the −Z direction.

Figure 26:
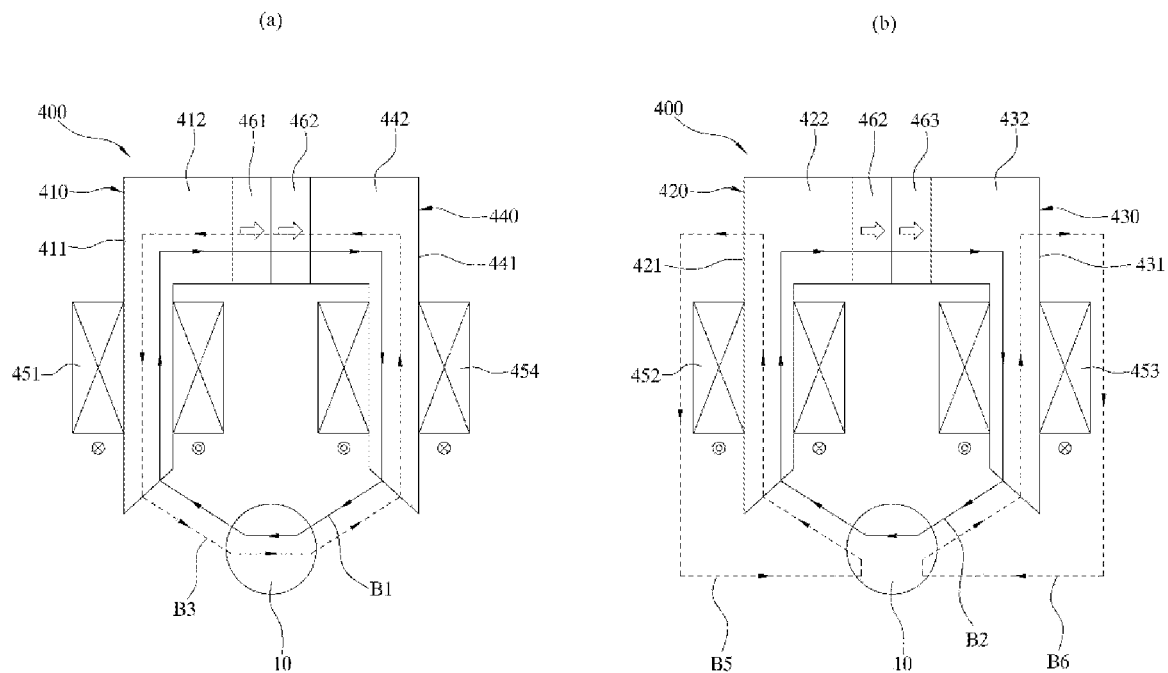

When the system intends to move the magnetically-levitated object 10 in the +X direction, the system may independently apply the current to each of the first winding 451, the second winding 452, the third winding 453 and the fourth winding 454 so that, as shown in FIG. 26, a fifth magnetic field B5 generated between the second iron core 420 and the magnetically-levitated object 10 is induced in the same direction as a direction of the second magnetic field B2, a sixth magnetic field B6 generated between the third iron core 430 and the magnetically-levitated object 10 is induced in the opposite direction to a direction of the second magnetic field B2, and the third magnetic field B3 is induced in the opposite direction to a direction of the first magnetic field B1, such that the magnetically-levitated object 10 may move in the +X direction.

Figure 27:
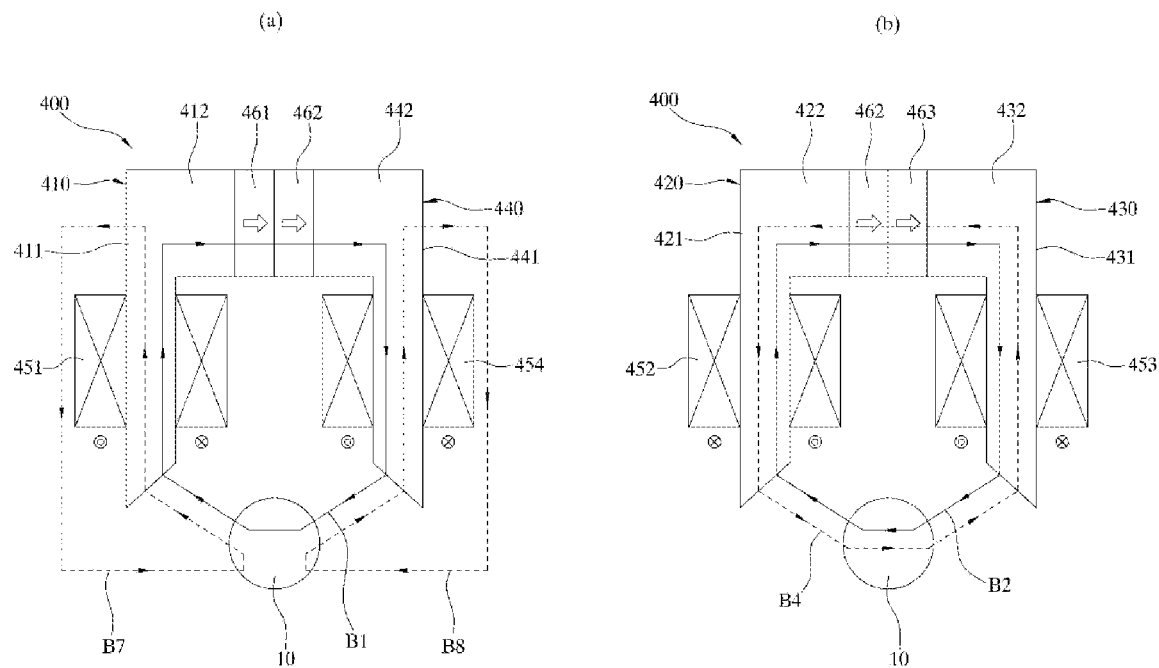

When the system intends to move the magnetically-levitated object 10 in the −X direction, the system may independently apply the current to each of the first winding 451, the second winding 452, the third winding 453 and the fourth winding 454 so that, as shown in FIG. 27, a seventh magnetic field B7 generated between the first iron core 410 and the magnetically-levitated object 10 is induced in the same direction as a direction of the first magnetic field B1, an eighth magnetic field B8 generated between the fourth iron core 440 and the magnetically-levitated object 10 is induced in the opposite direction to a direction of the first magnetic field B1, and the fourth magnetic field B4 is induced in the opposite direction to a direction of the second magnetic field B2, such that the magnetically-levitated object 10 may move in the −X direction.

Figure 28:
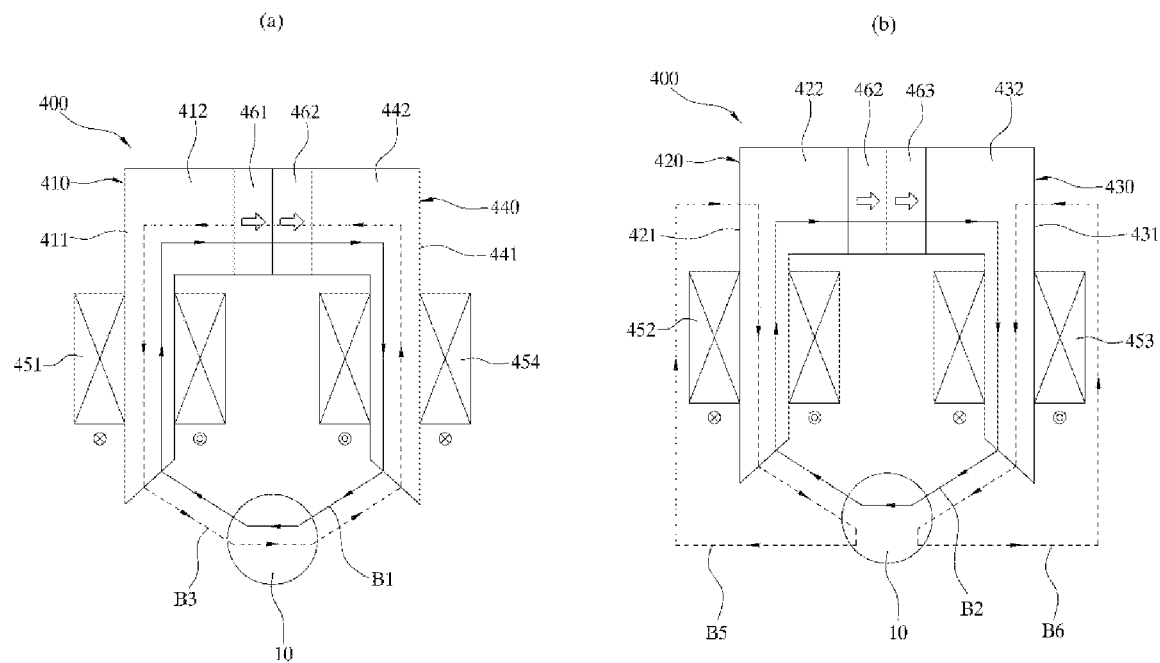

When the system intends to move the magnetically-levitated object 10 in the +Y direction, the system may independently apply the current to each of the first winding 451, the second winding 452, the third winding 453 and the fourth winding 454 so that, as shown in FIG. 28, the sixth magnetic field B6 is induced in the same direction as a direction of the second magnetic field B2, the fifth magnetic field B5 is induced in a direction opposite to that of the second magnetic field B2, and the third magnetic field B3 is induced in the opposite direction to a direction of the first magnetic field B1, such that the magnetically-levitated object 10 may move in the +Y direction.

Figure 29:
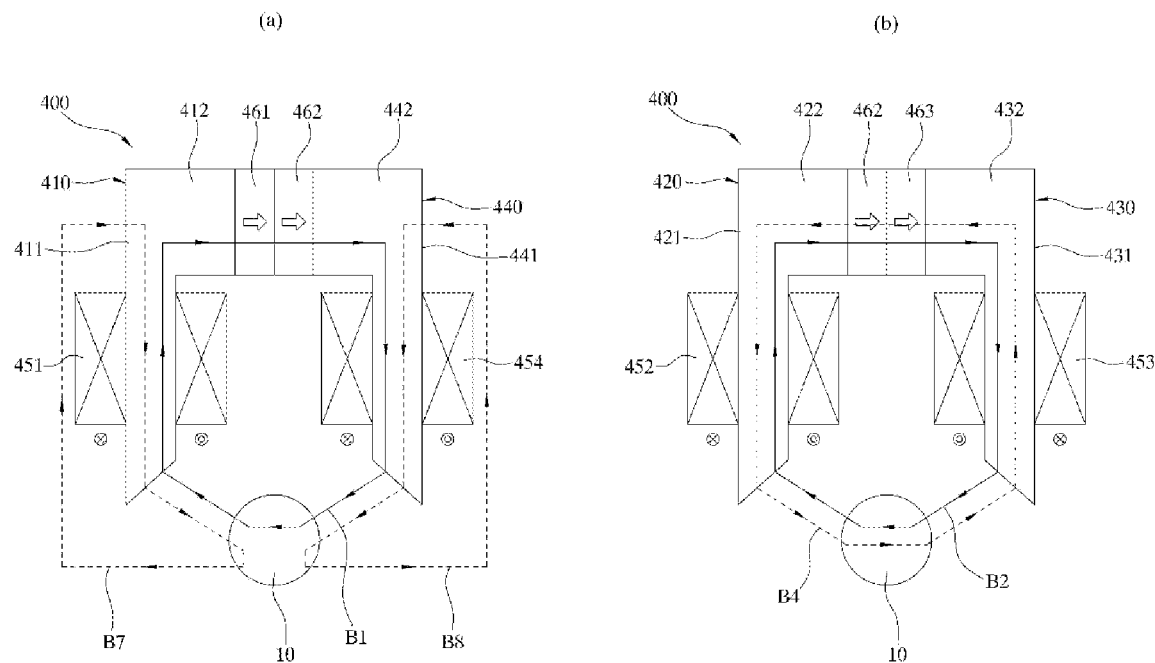

When the system intends to move the magnetically-levitated object 10 in the −Y direction, the system may independently apply the current to each of the first winding 451, the second winding 452, the third winding 453 and the fourth winding 454 so that, as shown in FIG. 29, the eighth magnetic field B8 is induced in the same direction as a direction of the first magnetic field B1, the seventh magnetic field B7 is induced in a direction opposite to that of the first magnetic field B1, and the fourth magnetic field B4 is induced in the opposite direction to a direction of the second magnetic field B2, such that the magnetically-levitated object 10 may move in the −Y direction.

Figure 30:
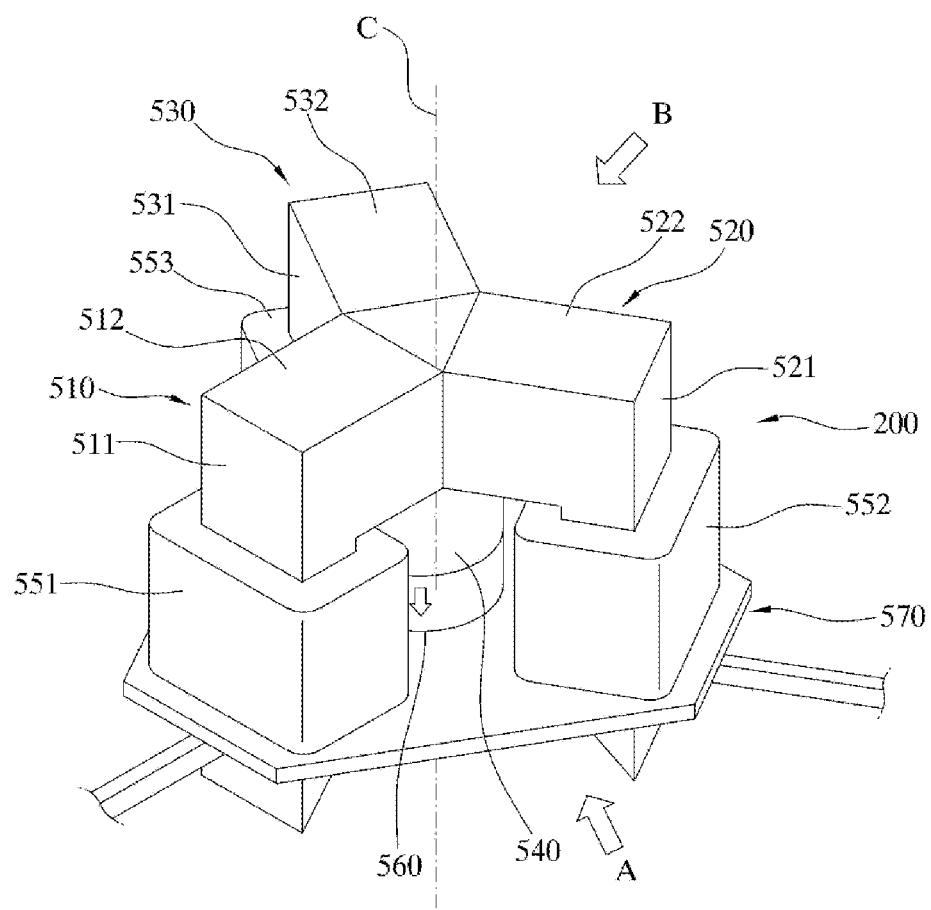
FIG. 30 is a perspective view for illustrating an actuator according to a fifth embodiment of the present disclosure and a multi-degrees of freedom magnetic levitation system using the same.

FIG. 30 is a perspective view for illustrating an actuator according to a fifth embodiment of the present disclosure and a multi-degrees of freedom magnetic levitation system using the same. FIGS. 31 to 35 are diagrams for illustrating a process in which the multi-degrees of freedom magnetic levitation system using the actuator according to the fifth embodiment of the present disclosure controls a position of a magnetically-levitated object.

In FIG. 31 to FIG. 35, (a) is a view of FIG. 30 in an A direction, and (b) is the view of FIG. 30 in a B direction.

Referring to FIG. 30, an actuator 500 according to the fifth embodiment of the present disclosure may include a first iron core 510, a second iron core 520, a third iron core 530, a central iron core 540, a first winding 551, a second winding 552, a third winding 553, and a permanent magnet 560.

The first iron core 510, the second iron core 520, the third iron core 530, the first winding 551, the second winding 552, and the third winding 553 are respectively identical with the first iron core 510, the second iron core 520, the third iron core 530, the first winding 551, the second winding 552, and the third winding 553 of the actuator 500 according to the second embodiment of the present disclosure. Thus, a detailed description thereof is omitted.

The central iron core 540 may be disposed under the end faces of the second pole 512 of the first iron core 510, the fourth pole 522 of the second iron core 520, and the sixth pole 532 of the third iron core 530 and may contact the second pole 512, the fourth pole 522 and the sixth pole 532. The central iron core 540 may extend in a parallel manner to the extension direction of the first pole 511 of the first iron core 510, the third pole 521 of the second iron core 520, and the fifth pole 531 of the third iron core 530. In one example, the central iron core 540 may have a cylindrical shape.

The permanent magnet 560 is fixed to a bottom face of the central iron core 540 such that a magnetic flux thereof is directed away from the bottom face of the central iron core 540.

Referring to FIG. 30, the multi-degrees of freedom magnetic levitation system according to the fifth embodiment of the present disclosure may include the actuator 500 according to the fifth embodiment and a sensor module 570.

Since a configuration of the actuator 500 has been described in detail above, a detailed description thereof will be omitted.

Since the sensor module 570 is substantially the same as the sensor module 260 according to the second embodiment of the present disclosure, a detailed description thereof will be omitted.

Figure 31:
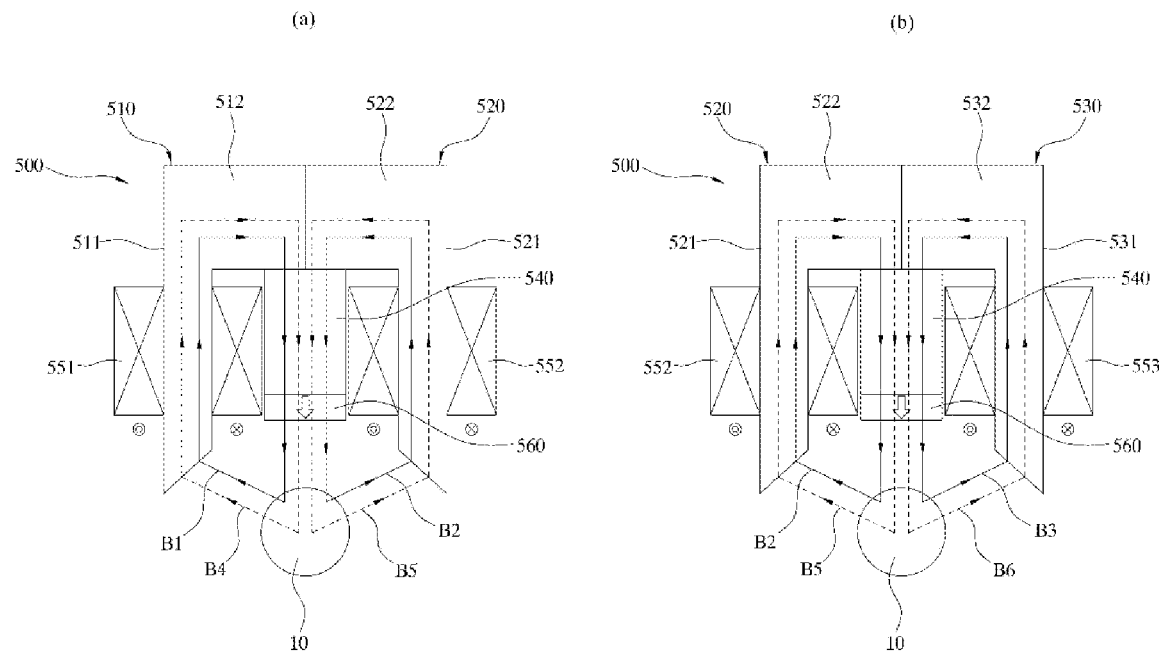
FIGS. 31 to 35 are diagrams for illustrating a process in which the multi-degrees of freedom magnetic levitation system using the actuator according to the fifth embodiment of the present disclosure controls a position of a magnetically-levitated object.

In the multi-degrees of freedom magnetic levitation system according to the fifth embodiment of the present disclosure in which the permanent magnet 560 is fixed to the bottom face of the central iron core 540 such that a magnetic flux thereof is directed away from the bottom face of the central iron core 540, the magnetic flux extends along each of the first to third iron core 510, 520, and 530 and then along the central iron core 540. Thus, as shown in FIG. 31, a first magnetic field B1 may be generated along a shape of a combination of the first iron core 510 and the central iron core 540, a second magnetic field B2 may be generated along a shape of a combination of the second iron core 520 and the central iron core 540, and a third magnetic field B3 may be generated along a shape of a combination of the third iron core 530 and the central iron core 540. In this regard, attractive forces acting between the magnetically-levitated object 10 and the first iron core 510, the second iron core 520, and the third iron core 530 are equal to each other. Accordingly, when the magnetically-levitated object 10 is positioned between the first pole 511 of the first iron core 510, the third pole 521 of the second iron core 520, and the fifth pole 531 of the third iron core 530, the magnetically-levitated object 10 may be levitated under the first magnetic field B1, the second magnetic field B2, and the third magnetic field B3.

The multi-degrees of freedom magnetic levitation system according to the fifth embodiment of the present disclosure may adjust a direction and an intensity of the current independently applied to each of the first winding 551, the second winding 552 and the third winding 553 to control the position of the magnetically-levitated object 10 in each of the Z-axis, X-axis and Y-axis directions.

When the system intends to move the magnetically-levitated object 10 in the +Z direction, the system may independently apply the current to each of the first winding 551, the second winding 552 and the third winding 553 so that, as shown in FIG. 31, a fourth magnetic field B4 is induced in the same direction as a direction of the first magnetic field B1, a fifth magnetic field B5 is induced in the same direction as a direction of the second magnetic field B2, and a sixth magnetic field B6 is induced in the same direction as a direction of the third magnetic field B3, such that a total magnetic field intensity increases. Thus, the levitation force acting on the magnetically-levitated object 10 in the +Z direction is increased to move the magnetically-levitated object 10 in the +Z direction.

Figure 32:
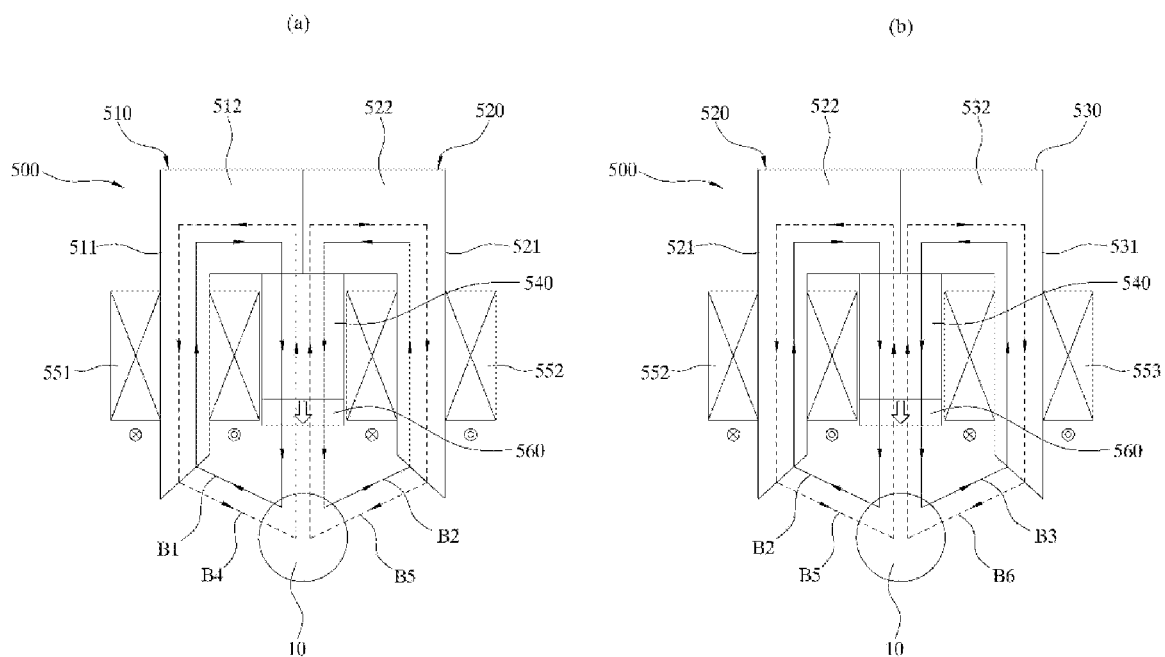

When the system intends to move the magnetically-levitated object 10 in the −Z direction, the system may independently apply the current to each of the first winding 551, the second winding 552, and the third winding 553 so that, as shown in FIG. 32, the fourth magnetic field B4 is induced in the opposite direction to a direction of the first magnetic field B1, the fifth magnetic field B5 is induced in a direction opposite to the second magnetic field B2, and the sixth magnetic field B6 is induced in the opposite direction to a direction of the third magnetic field B3, such that the magnetically-levitated object 10 may move in the −Z direction.

Figure 33:
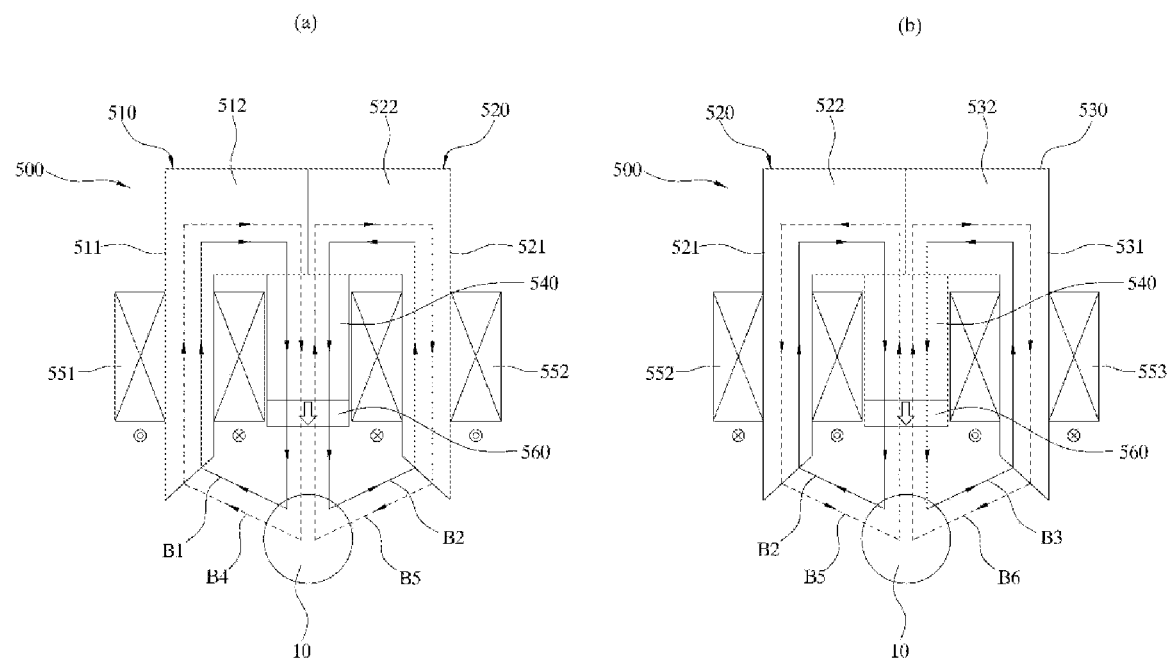

When the system intends to move the magnetically-levitated object 10 in the X direction, the system may independently apply the current to each of the first winding 551, the second winding 552, and the third winding 553 so that, as shown in FIG. 33, the fourth magnetic field B4 is induced in the same direction as a direction of the first magnetic field B1, the fifth magnetic field B5 is induced in a direction opposite to that of the second magnetic field B2, and the sixth magnetic field B6 is induced in the opposite direction to a direction of the third magnetic field B3, such that the magnetically-levitated object 10 may move in the X direction.

Figure 34:
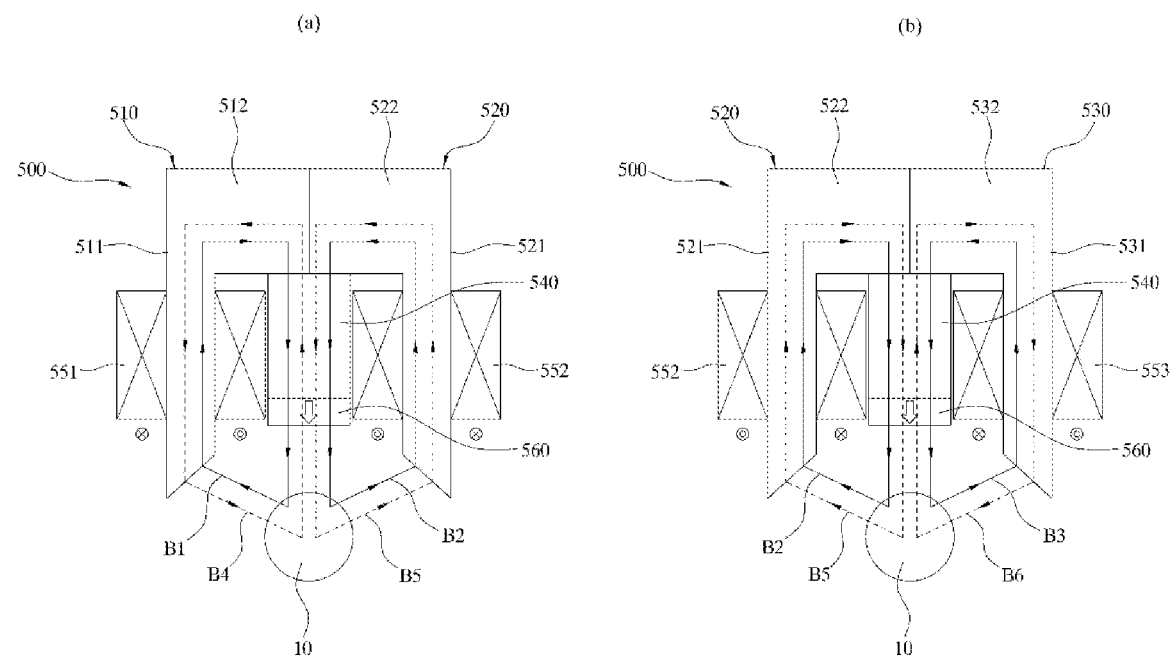

When the system intends to move the magnetically-levitated object 10 in the Y1 direction, the system may independently apply the current to each of the first winding 551, the second winding 552, and the third winding 553 so that, as shown in FIG. 34, the fifth magnetic field B5 is induced in the same direction as a direction of the second magnetic field B2, the fourth magnetic field B4 is induced in a direction opposite to that of the first magnetic field B1, and the sixth magnetic field B6 is induced in the opposite direction to a direction of the third magnetic field B3, such that the magnetically-levitated object 10 may move in the Y1 direction.

Figure 35:
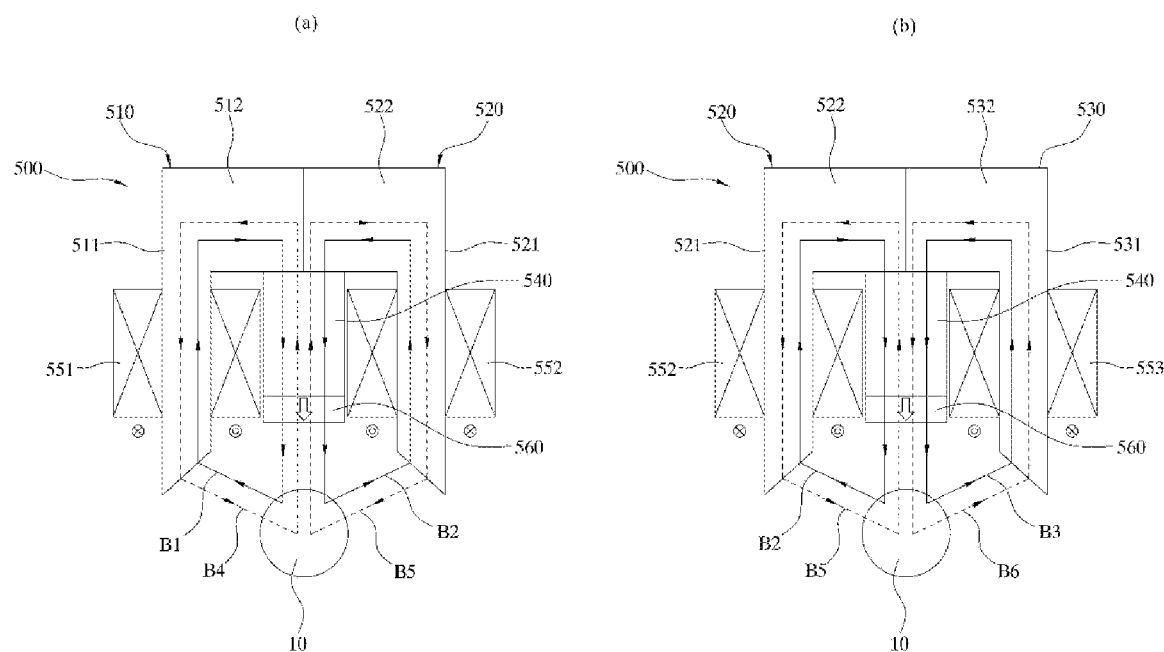

When the system intends to move the magnetically-levitated object 10 in the Y2 direction, the system may independently apply the current to each of the first winding 551, the second winding 552, and the third winding 553 so that, as shown in FIG. 35, the sixth magnetic field B6 is induced in the same direction as a direction of the third magnetic field B3, the fourth magnetic field B4 is induced in a direction opposite to that of the first magnetic field B1, and the fifth magnetic field B5 is induced in the opposite direction to a direction of the second magnetic field B2, such that the magnetically-levitated object 10 may move in the Y2 direction.

Figure 36:
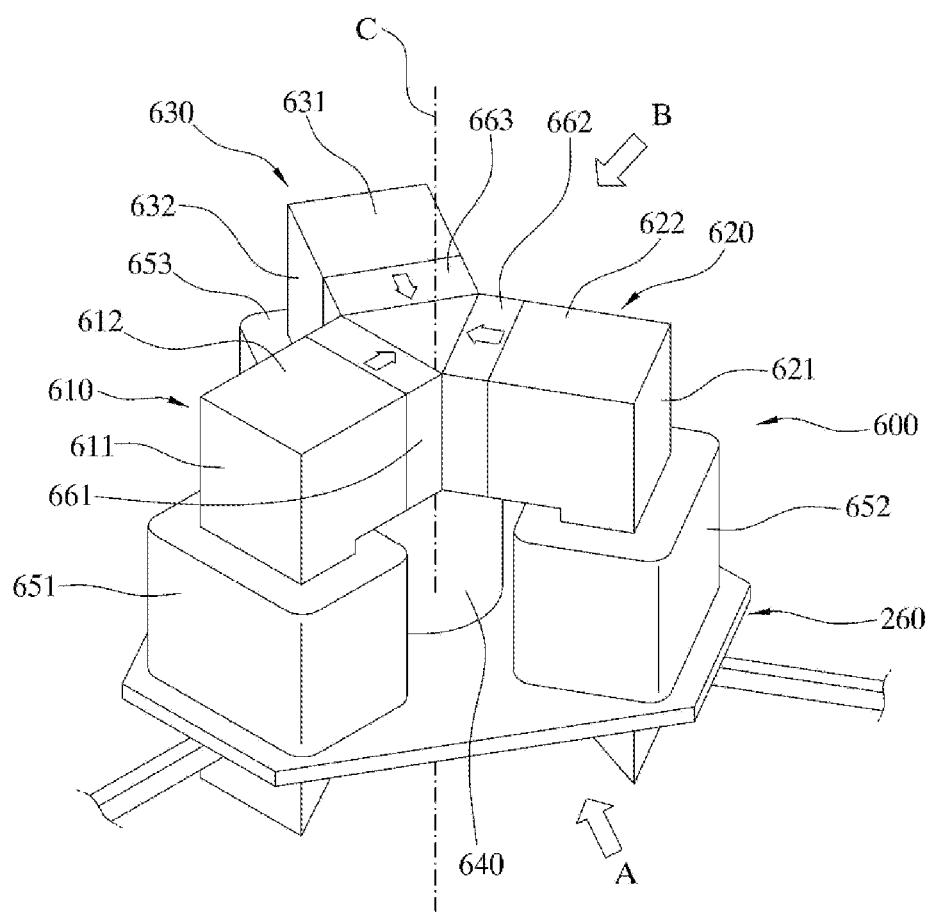
FIG. 36 is a perspective view for illustrating an actuator according to a sixth embodiment of the present disclosure and a multi-degrees of freedom magnetic levitation system using the same.
Figure 37:
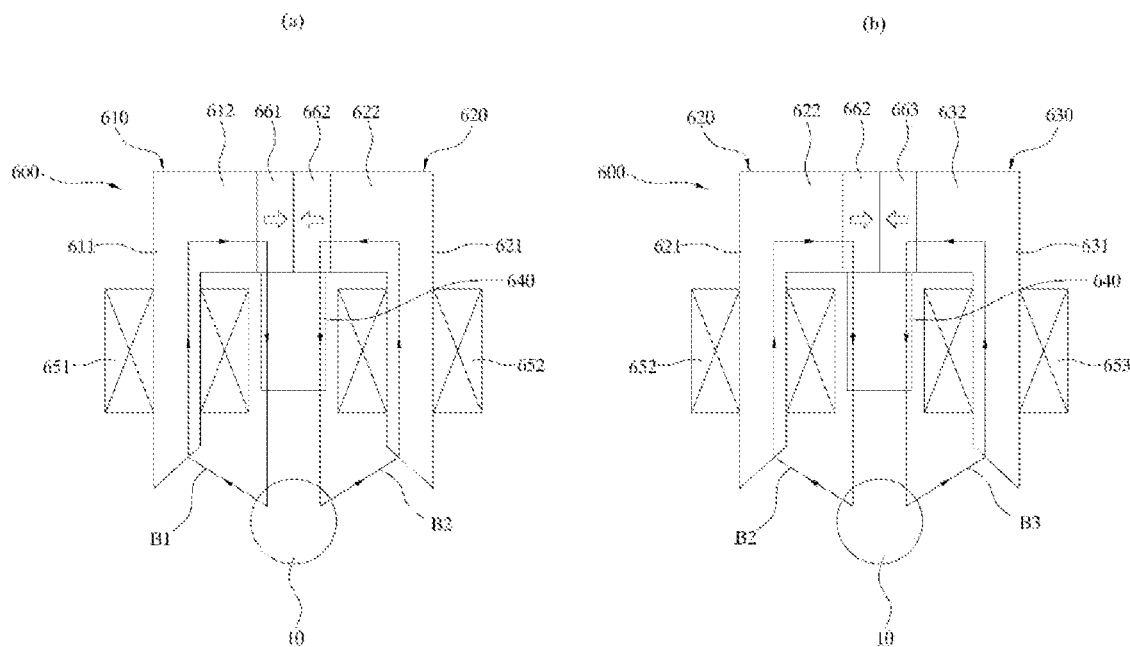
FIG. 37 is a diagram showing magnetic field generation in the actuator according to the sixth embodiment of the present disclosure.

FIG. 36 is a perspective view for illustrating an actuator according to a sixth embodiment of the present disclosure and a multi-degrees of freedom magnetic levitation system using the same. FIG. 37 is a view showing the magnetic field generation in the actuator according to the sixth embodiment of the present disclosure.

In FIG. 37, (a) is a view of FIG. 36 in an A direction, and (b) is a view of FIG. 36 in a B direction.

Referring to FIG. 36, actuator 600 according to the sixth embodiment of the present disclosure may include a first iron core 610, a second iron core 620, a third iron core 630, a central iron core 640, a first winding 651, a second winding 652, a third winding 653, a first permanent magnet 661, a second permanent magnet 662, and a third permanent magnet 663.

The first iron core 610, the second iron core 620, the third iron core 630, the first winding 651, the second winding 652 and the third winding 653 are respectively identical with the first iron core, the second iron core, the third iron core, the first winding, the second winding and the third winding of the actuator 200 according to the second embodiment of the present disclosure. Thus, a detailed description thereof will be omitted.

The first permanent magnet 661 is fixed to the end face of the second pole 612 of the first iron core 610 so that a magnetic flux thereof is directed toward the imaginary axial line C at a center of an array of the first iron core 610, the second iron core 620 and the third iron core 630.

The second permanent magnet 662 is fixed to the end face of the fourth pole 622 of the second iron core 620 so that a magnetic flux thereof is directed toward the axial line C.

The third permanent magnet 663 is fixed to the end face of the sixth pole 632 of the third iron core 630 so that a magnetic flux thereof is directed toward the axial line C.

The central iron core 640 may be in contact with the first to third permanent magnets 661, 662, and 663 and may be disposed under the first to third permanent magnets 661, 662, and 663. The central iron core 640 may extend in a parallel manner to the extension direction of each of the first pole 611 of the first iron core 610, the third pole 621 of the second iron core 620, and the fifth pole 631 of the third iron core 630. In one example, the central iron core 640 may have a cylindrical shape.

Referring to FIG. 36, the multi-degrees of freedom magnetic levitation system according to the sixth embodiment of the present disclosure may include the actuator 600 according to the sixth embodiment and a sensor module 670.

Since a configuration of the actuator 600 has been described in detail above, a detailed description thereof will be omitted.

Since the sensor module 670 is substantially the same as the sensor module 260 according to the second embodiment of the present disclosure, a detailed description thereof will be omitted.

In the multi-degrees of freedom magnetic levitation system according to the sixth embodiment of the present disclosure, as shown in FIG. 37, the magnetic flux from each of the first to third permanent magnets 661, 662, and 663 is directed toward the central iron core 640 contacting the first to third permanent magnets 661, 662, and 663. Thus, the magnetic flux extends along each of the first to third iron cores 610, 620, and 630 and along the central iron core 640. Thus, a first magnetic field B1 may be generated along a shape of a combination of the first iron core 610 and the central iron core 640, a second magnetic field B2 may be generated along a shape of a combination of the second iron core 620 and the central iron core 640, and a third magnetic field B3 may be generated along a shape of a combination of the third iron core 630 and the central iron core 640. In this regard, the attractive forces acting between the magnetically-levitated object 10 and the first iron core 610, the second iron core 620 and the third iron core 630 are equal to each other. Accordingly, when the magnetically-levitated object 10 is positioned between the first pole 611 of the first iron core 610, the third pole 621 of the second iron core 620, and the fifth pole 631 of the third iron core 630, the magnetically-levitated object 10 may be levitated under the first magnetic field B1, the second magnetic field B2 and the third magnetic field B3.

The multi-degrees of freedom magnetic levitation system according to the sixth embodiment of the present disclosure may adjust a direction and an intensity of the current independently applied to each of the first winding 651, the second winding 652, and the third winding 653 to control the position of the magnetically-levitated object 10 in each of the Z-axis, X-axis and Y-axis directions.

A process in which the multi-degrees of freedom magnetic levitation system according to the sixth embodiment of the present disclosure controls the position of the magnetically-levitated object 10 in each of the Z-axis, X-axis, and Y-axis directions is identical with the process in which the multi-degrees of freedom magnetic levitation system according to the fifth embodiment of the present disclosure controls the position of the magnetically-levitated object 10 in each of the Z-axis, X-axis, and Y-axis directions. Thus, a detailed description thereof will be omitted.

Figure 38:
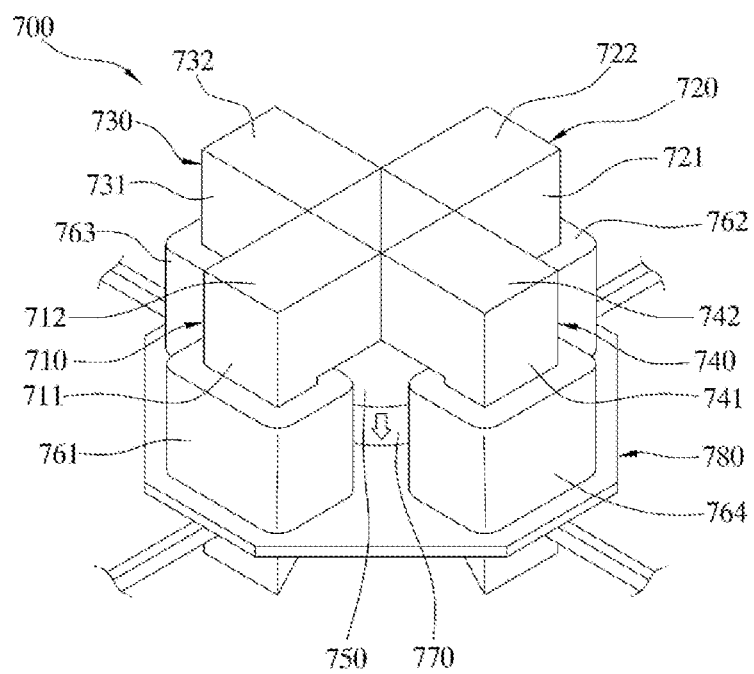
FIG. 38 is a perspective view for illustrating an actuator according to a seventh embodiment of the present disclosure and a multi-degrees of freedom magnetic levitation system using the same.

FIG. 38 is a perspective view for illustrating an actuator according to a seventh embodiment of the present disclosure and a multi-degrees of freedom magnetic levitation system using the same. FIG. 39 to FIG. 44 are diagrams for illustrating a process in which the multi-degrees of freedom magnetic levitation system using the actuator according to the seventh embodiment of the present disclosure controls a position of a magnetically-levitated object.

In FIG. 39 to FIG. 44, (a) shows a state in which a first iron core 710 and a second iron core 720 shown in FIG. 38 face each other, and (b) shows a state in which a third iron core 730 and a fourth iron core 740 shown in FIG. 38 face each other.

Referring to FIG. 38, an actuator 700 according to the seventh embodiment of the present disclosure may include the first iron core 710, the second iron core 720, the third iron core 730, the fourth iron core 740, a central iron core 750, a first winding 761, a second winding 762, a third winding 763, a fourth winding 764, and a permanent magnet 770.

The first iron core 710, the second iron core 720, the third iron core 730, the fourth iron core 740, the first winding 761, the second winding 762, the third winding 763, and the fourth winding 764 are respectively identical with the first iron core, the second iron core, the third iron core, the fourth iron core, the first winding, the second winding, the third winding, and the fourth winding of the actuator 300 according to the third embodiment of the present disclosure. Thus, a detailed description thereof will be omitted.

The central iron core 750 may be disposed below the end faces of the second pole 712 of the first iron core 710, the fourth pole 722 of the second iron core 720, the sixth pole 732 of the third iron core 730, and the eighth pole 742 of the fourth iron core 740 and may be in contact with the second pole 712, the fourth pole 722, the sixth pole 732, and the eighth pole 742, and may extend in a parallel manner to the extension direction of each of the first pole 711 of the first iron core 710, the third pole 721 of the second iron core 720, the fifth pole 731 of the third iron core 730, and the seventh pole 741 of the fourth iron core 740. In one example, the central iron core 750 may have a cylindrical shape.

The permanent magnet 770 is fixed to a bottom face of the central iron core 750 such that a magnetic flux thereof is directed away from the bottom face of the central iron core 750.

Referring to FIG. 38, the multi-degrees of freedom magnetic levitation system according to the seventh embodiment of the present disclosure may include the actuator 700 according to the seventh embodiment and a sensor module 780.

Since a configuration of the actuator 700 has been described in detail above, a detailed description thereof will be omitted.

Since the sensor module 780 is substantially the same as the sensor module 370 according to the third embodiment of the present disclosure, a detailed description will be omitted.

Figure 39:
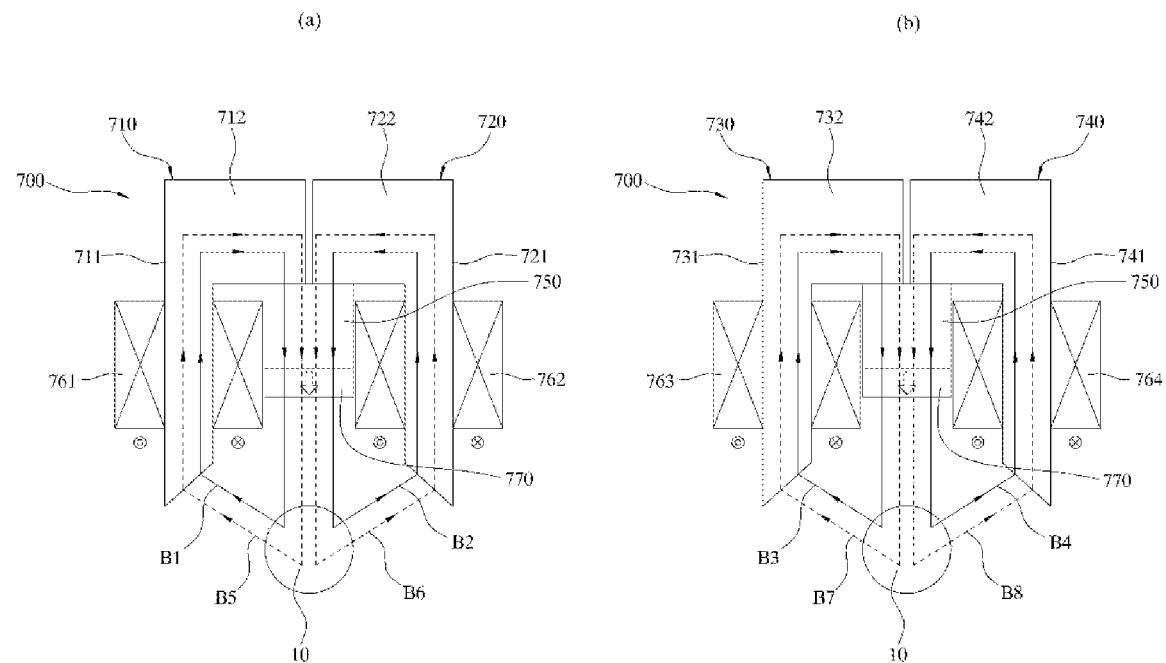
FIG. 39 to FIG. 44 are diagrams for illustrating a process in which the multi-degrees of freedom magnetic levitation system using the actuator according to the seventh embodiment of the present disclosure controls a position of a magnetically-levitated object.

In the multi-degrees of freedom magnetic levitation system according to the seventh embodiment of the present disclosure in which the permanent magnet 770 is fixed to the bottom face of the central iron core 750 such that a magnetic flux thereof is directed away from the bottom face of the central iron core 750, as shown in FIG. 39, the magnetic flux extends along each of the first to fourth iron cores 710, 720, 730 and 740, and along the central iron core 750. Thus, a first magnetic field B1 may be generated along a shape of a combination of the first iron core 710 and the central iron core 750, a second magnetic field B2 may be generated along a shape of a combination of the second iron core 720 and the central iron core 750, a third magnetic field B3 may be generated along a shape of a combination of the third iron core 730 and the central iron core 750, and a fourth magnetic field B4 may be generated along a shape of a combination of the fourth iron core 740 and the central iron core 750. In this regard, attractive forces acting between the magnetically-levitated object 10 and the first iron core 710, the second iron core 720, the third iron core 730 and the fourth iron core 740 are equal to each other. Accordingly, when the magnetically-levitated object 10 is positioned between the first pole 711 of the first iron core 710, the third pole 721 of the second iron core 720, the fifth pole 731 of the third iron core 730 and the seventh pole 741 of the fourth iron core 740, the magnetically-levitated object 10 may be levitated under the first magnetic field B1, the second magnetic field B2, the third magnetic field B3 and the fourth magnetic field B4.

The multi-degrees of freedom magnetic levitation system according to the seventh embodiment of the present disclosure may adjust a direction and an intensity of the current independently applied to each of the first winding 761, the second winding 762, the third winding 763 and the fourth winding 764 to control the position of the magnetically-levitated object 10 in each of the Z-axis, X-axis, and Y-axis directions.

When the system intends to move the magnetically-levitated object 10 in the +Z direction, the system may independently apply the current to each of the first winding 761, the second winding 762, the third winding 763 and the fourth winding 764 so that, as shown in FIG. 39, a fifth magnetic field B5 is induced in the same direction as a direction of the first magnetic field B1, a sixth magnetic field B6 is induced in the same direction as a direction of the second magnetic field B2, a seventh magnetic field B7 is induced in the same direction as a direction of the third magnetic field B3, and an eighth magnetic field B8 is induced in the same direction as a direction of the fourth magnetic field B4. Thus, a total magnetic field intensity increases, such that the levitation force acting on the magnetically-levitated object 10 in the +Z direction increases, so that the magnetically-levitated object 10 may move in the +Z direction.

Figure 40:
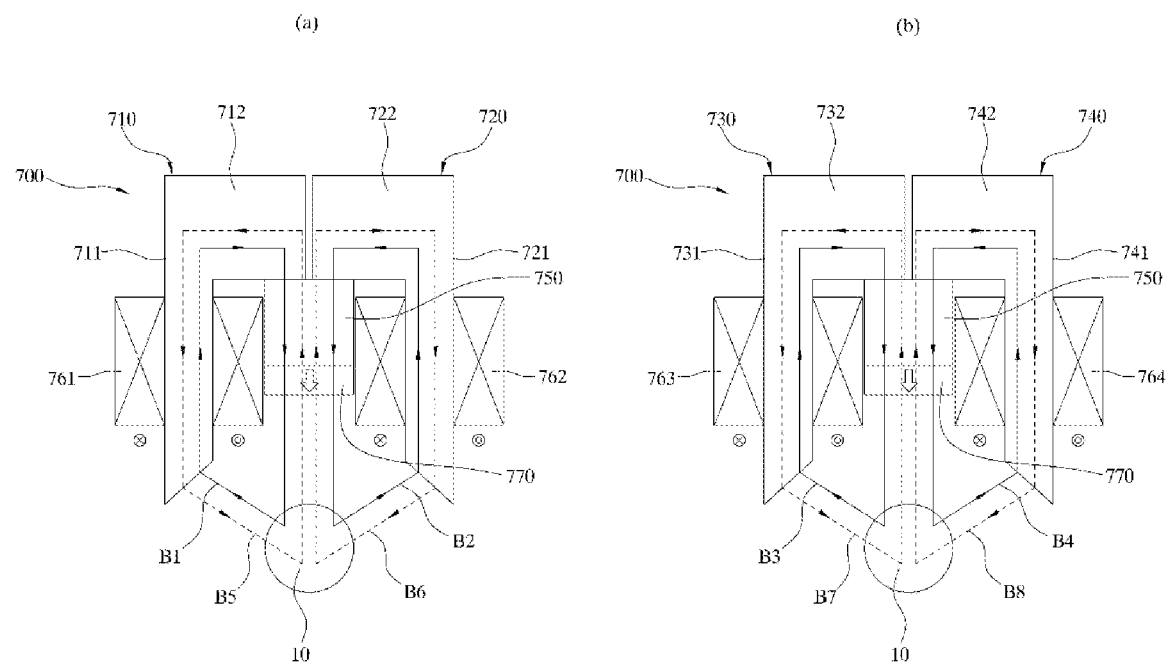

When the system intends to move the magnetically-levitated object 10 in the −Z direction, the system may independently apply the current to each of the first winding 761, the second winding 762, the third winding 763 and the fourth winding 764 so that, a shown in FIG. 40, the fifth magnetic field B5 is induced in the opposite direction to a direction of the first magnetic field B1, the sixth magnetic field B6 is induced in a direction opposite to the second magnetic field B2, the seventh magnetic field B7 is induced in a direction opposite to the third magnetic field B3, and the eighth magnetic field B8 is induced in the opposite direction to a direction of the fourth magnetic field B4, thereby moving the magnetically-levitated object 10 in the −Z direction.

Figure 41:
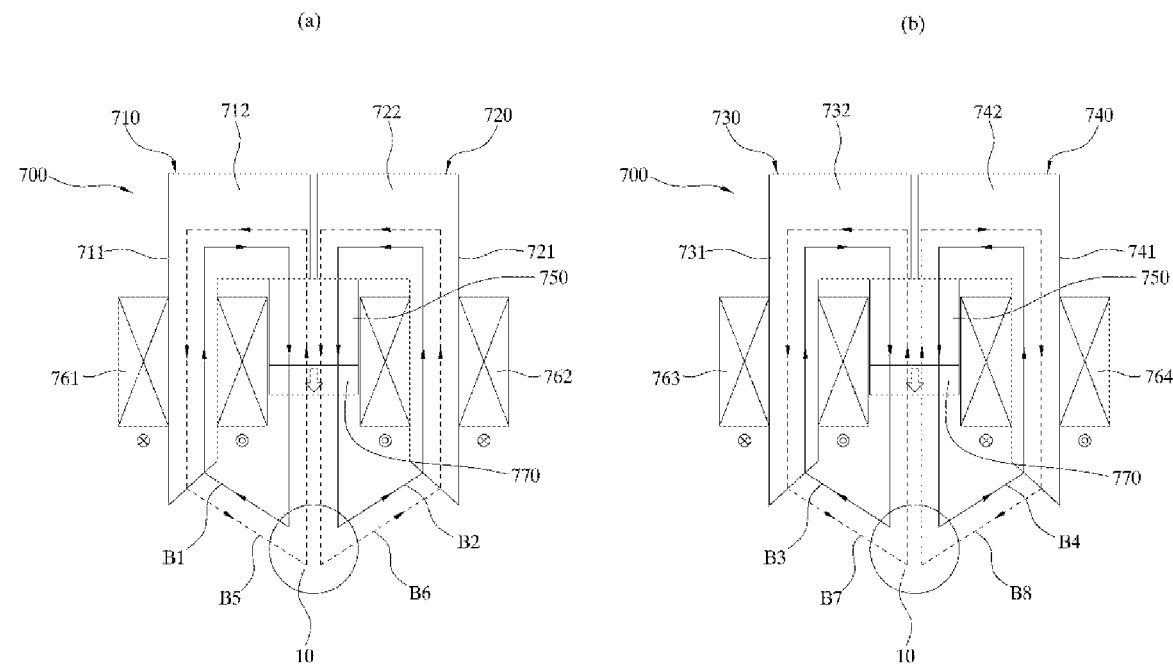

When the system intends to move the magnetically-levitated object 10 in the +X direction, the system may independently apply the current to each of the first winding 761, the second winding 762, the third winding 763 and the fourth winding 764 so that, as shown in FIG. 41, the fifth magnetic field B5 is induced in the opposite direction to a direction of the first magnetic field B1, the sixth magnetic field B6 is induced in the same direction as a direction of the second magnetic field B2, the seventh magnetic field B7 is induced in a direction opposite to that of the third magnetic field B3, and the eighth magnetic field B8 is induced in the opposite direction to a direction of the fourth magnetic field B4, thereby moving the magnetically-levitated object 10 in the +X direction.

Figure 42:
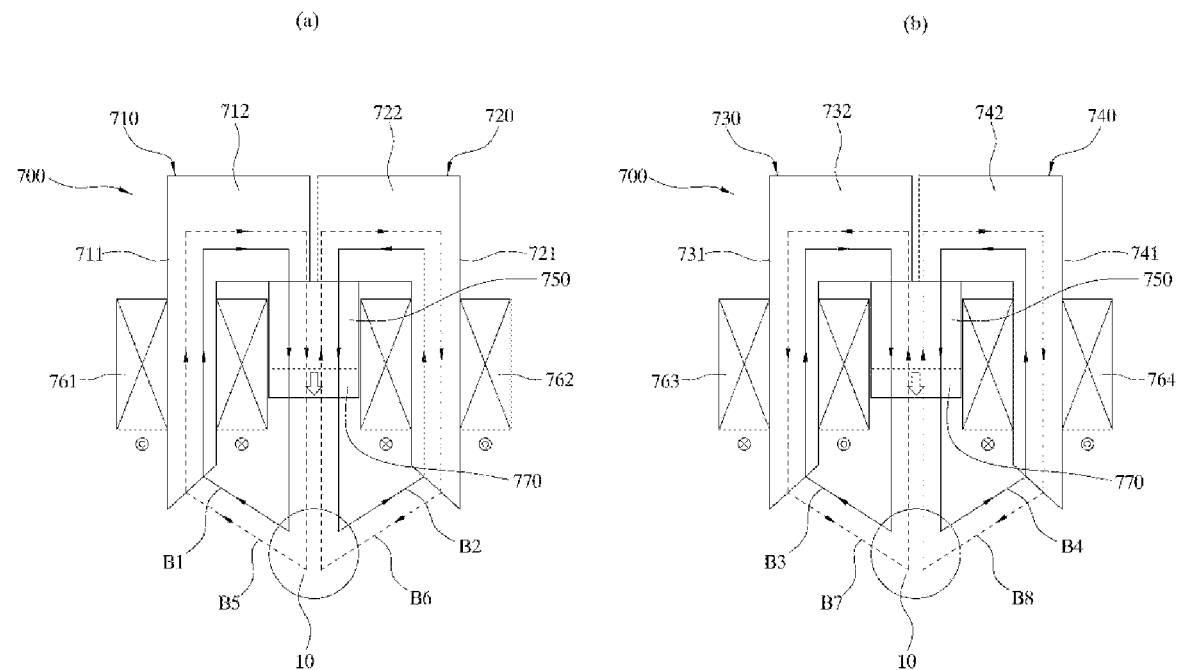

When the system intends to move the magnetically-levitated object 10 in the −X direction, the system may independently apply the current to each of the first winding 761, the second winding 762, the third winding 763 and the fourth winding 764 so that, as shown in FIG. 42, the fifth magnetic field B5 is induced in the same direction as a direction of the first magnetic field B1, the sixth magnetic field B6 is induced in a direction opposite to that of the second magnetic field B2, the seventh magnetic field B7 is induced in a direction opposite to that of the third magnetic field B3, and the eighth magnetic field B8 is induced in the opposite direction to a direction of the fourth magnetic field B4, thereby moving the magnetically-levitated object 10 in the −X direction.

Figure 43:
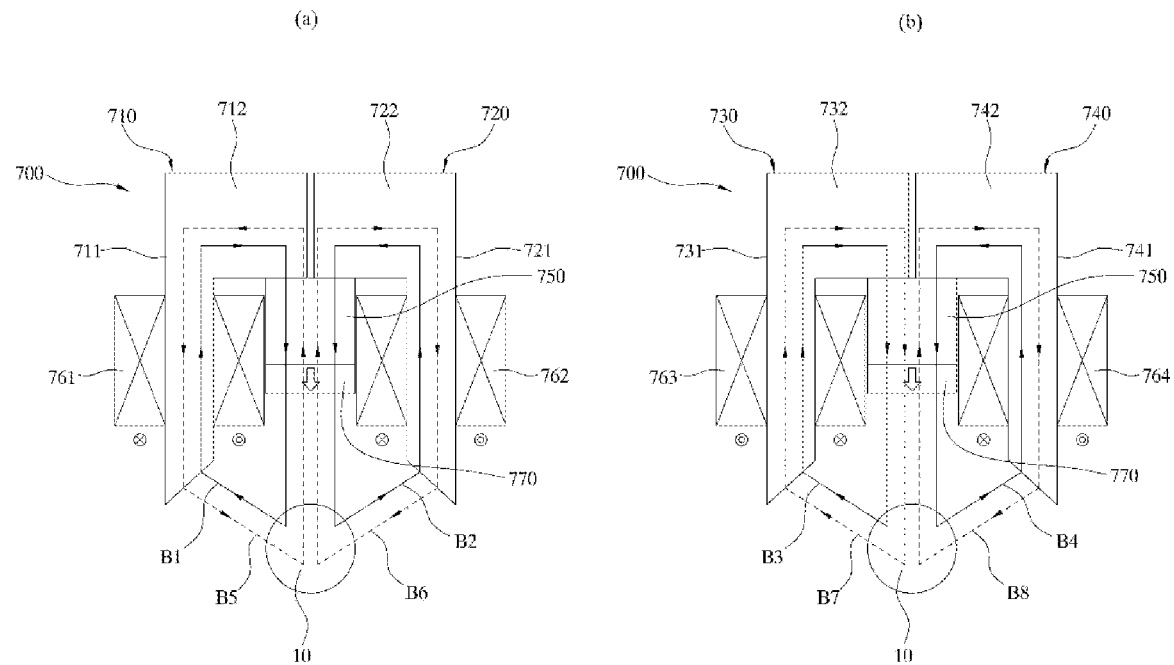

When the system intends to move the magnetically-levitated object 10 in the +Y direction, the system may independently apply the current to each of the first winding 761, the second winding 762, the third winding 763 and the fourth winding 764 so that, as shown in FIG. 43, the seventh magnetic field B7 is induced in the same direction as a direction of the third magnetic field B3, the fifth magnetic field B5 is induced in a direction opposite to that of the first magnetic field B1, the sixth magnetic field B6 is induced in a direction opposite to that of the second magnetic field B2, and the eighth magnetic field B8 is induced in the opposite direction to a direction of the fourth magnetic field B4, thereby moving the magnetically-levitated object 10 in the +Y direction.

Figure 44:
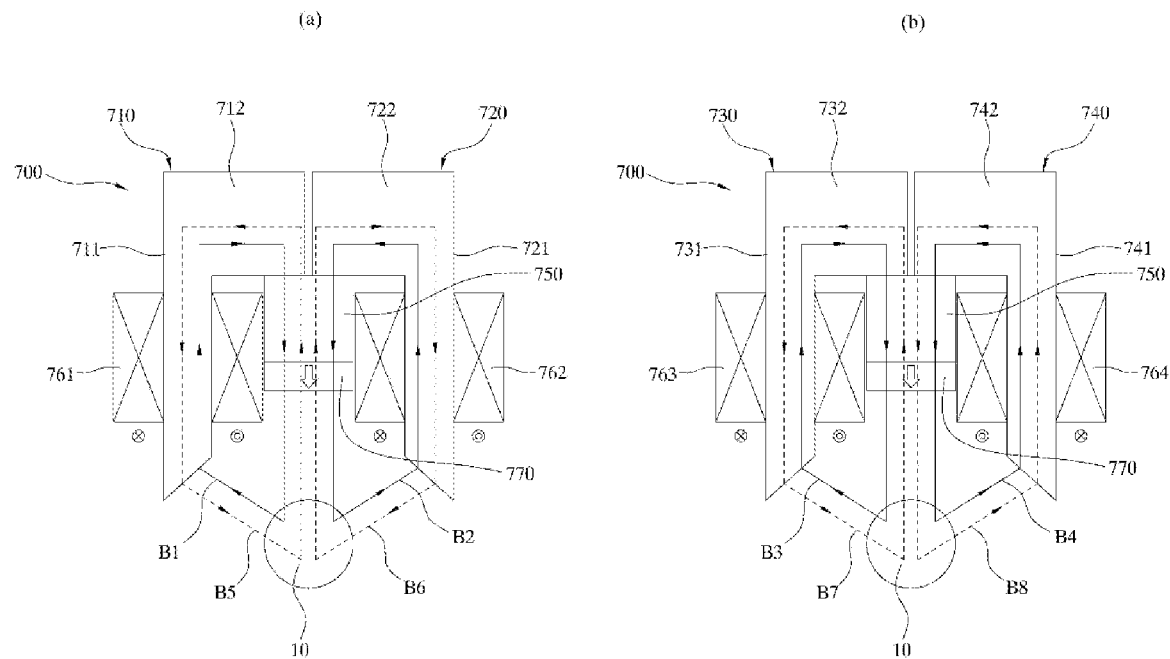

When the system intends to move the magnetically-levitated object 10 in the −Y direction, the system may independently apply the current to each of the first winding 761, the second winding 762, the third winding 763 and the fourth winding 764 so that, as shown in FIG. 44, the eighth magnetic field B8 is induced in the same direction as a direction of the fourth magnetic field B4, the fifth magnetic field B5 is induced in a direction opposite to that of the first magnetic field B1, the sixth magnetic field B6 is induced in a direction opposite to that of the second magnetic field B2, and the seventh magnetic field B7 is induced in the opposite direction to a direction of the third magnetic field B3, such that the magnetically-levitated object 10 may move in the −Y direction.

Figure 45:
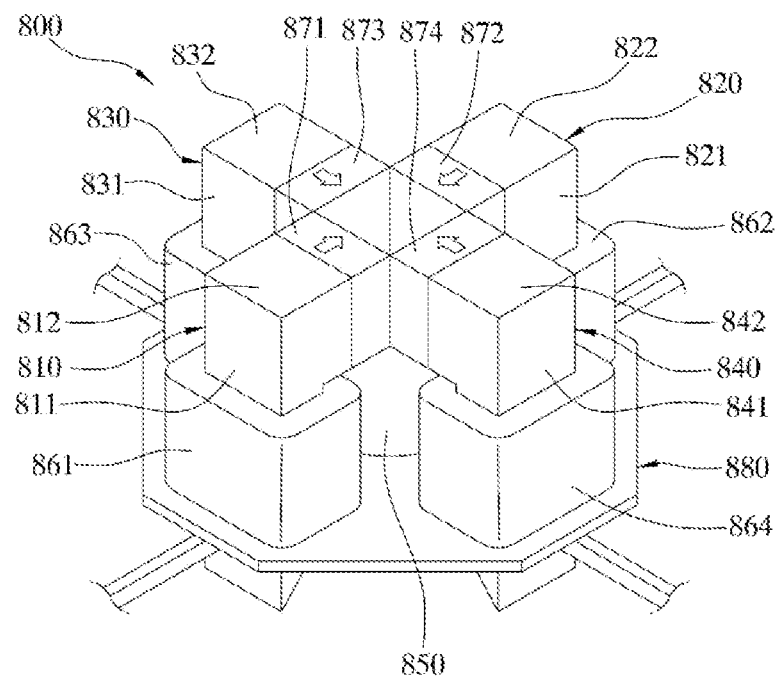
FIG. 45 is a perspective view for illustrating an actuator according to an eighth embodiment of the present disclosure and a multi-degrees of freedom magnetic levitation system using the same.
Figure 46:
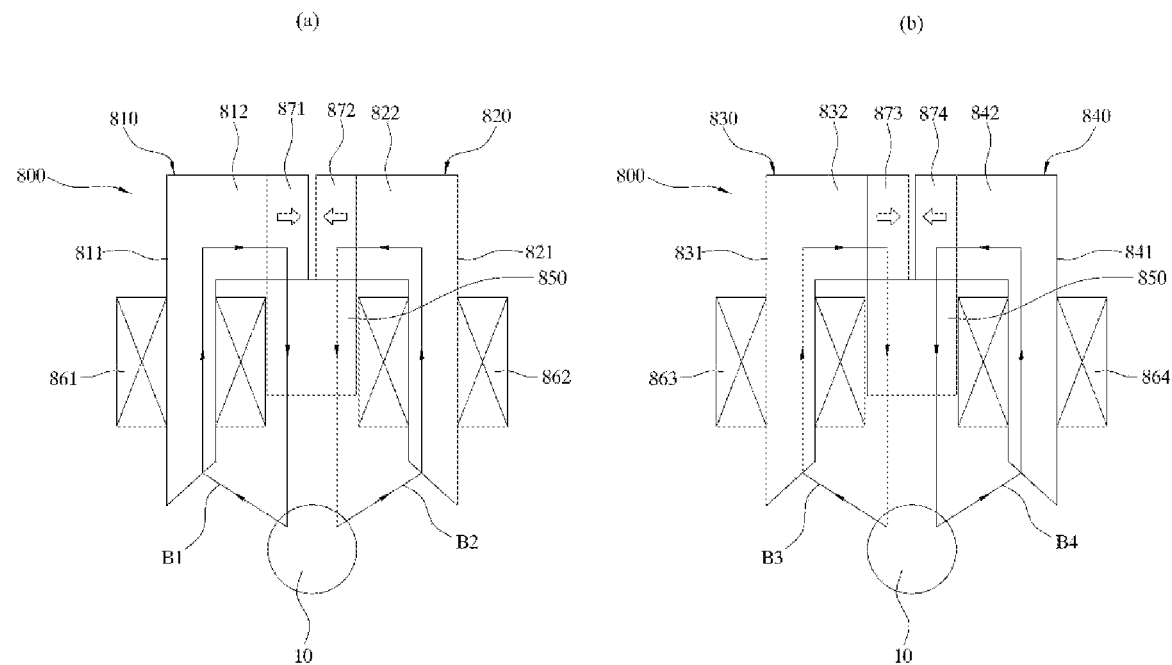
FIG. 46 is a diagram showing magnetic field generation in the actuator according to the eighth embodiment of the present disclosure.

FIG. 45 is a perspective view for illustrating an actuator according to an eighth embodiment of the present disclosure and a multi-degrees of freedom magnetic levitation system using the same. FIG. 46 is a diagram showing the magnetic field generation in the actuator according to the eighth embodiment of the present disclosure.

In FIG. 46, (a) shows a state in which a first iron core 810 and a second iron core 820 shown in FIG. 45 face each other, and (b) shows a state in which a third iron core 830 and a fourth iron core 840 shown in FIG. 45 face each other.

Referring to FIG. 45, an actuator 800 according to the eighth embodiment of the present disclosure may include the first iron core 810, the second iron core 820, the third iron core 830, the fourth iron core 840, a central iron core 850, a first winding 861, a second winding 862, a third winding 863, a fourth winding 864, a first permanent magnet 871, a second permanent magnet 872, a third permanent magnet 873 and a fourth permanent magnet 874.

The first iron core 810, the second iron core 820, the third iron core 830, the fourth iron core 840, the first winding 861, the second winding 862, the third winding 863, the fourth winding 864 are respectively identical with the first iron core, the second iron core, the third iron core, the fourth iron core, the first winding, the second winding, the third winding, and the fourth winding of the actuator 300 according to the third embodiment of the present disclosure. Thus, a detailed description thereof will be omitted.

The first permanent magnet 871 may be fixed to the end face of the second pole 812 so that a magnetic flux thereof is directed toward the end face of the fourth pole 822 of the second iron core 820 facing the end face of the second pole 812 of the first iron core 810.

The second permanent magnet 872 may be fixed to the end face of the fourth pole 822 such that a magnetic flux thereof is directed toward the end face of the second pole 812.

The third permanent magnet 873 may be fixed to the end face of the sixth pole 832 so that a magnetic flux thereof is directed toward the end face of the eighth pole 842 of the fourth iron core 840 facing the end face of the sixth pole 832 of the third iron core 830.

The fourth permanent magnet 874 may be fixed to the end face of the eighth pole 842 such that a magnetic flux thereof is directed toward the end face of the sixth pole 832.

The central iron core 850 may be in contact with the first to fourth permanent magnets 871, 872, 873, and 874 and may be disposed under the first to fourth permanent magnets 871, 872, 873, and 874, and may extend in a parallel manner to the extension direction of each of the first pole 811 of the first iron core 810, the second iron core 820 the third pole 821 of the third iron core 830, the fifth pole 831 of the third iron core 830, and the seventh pole 841 of the fourth iron core 840. In one example, the central iron core 850 may have a cylindrical shape.

Referring to FIG. 45, the multi-degrees of freedom magnetic levitation system according to the eighth embodiment of the present disclosure may include the actuator 800 to the eighth embodiment of the present disclosure and a sensor module 880.

Since a configuration of the actuator 800 has been described in detail above, a detailed description thereof will be omitted.

Since the sensor module 880 is substantially the same as the sensor module 370 according to the third embodiment of the present disclosure, a detailed description thereof will be omitted.

In the multi-degrees of freedom magnetic levitation system according to the eighth embodiment of the present disclosure, as shown in FIG. 46, the magnetic flux may extend along each of the first to fourth permanent magnets 871, 872, 873, and 874 and along the central iron core 850 contacting the first to fourth permanent magnets 871, 872, 873 and 874. Thus, a first magnetic field B1 may be generated along a shape of a combination of the first iron core 810 and the central iron core 850, a second magnetic field B2 may be generated along a shape of a combination of the second iron core 820 and the central iron core 850, a third magnetic field B3 may be generated along a shape of a combination of the third iron core 830 and the central iron core 850, and a fourth magnetic field B4 may be generated along a shape of a combination of the fourth iron core 840 and the central iron core 850. In this regard, attractive forces acting between the magnetically-levitated object 10 and the first iron core 810, the second iron core 820, the third iron core 830 and the fourth iron core 840 are equal to each other. Accordingly, when the magnetically-levitated object 10 is positioned between the first pole 811 of the first iron core 810, the third pole 821 of the second iron core 820, the fifth pole 831 of the third iron core 830, and the seventh pole 841 of the fourth iron core 840, the magnetically-levitated object 10 may be levitated under the first magnetic field B1, the second magnetic field B2, the third magnetic field B3, and the fourth magnetic field B4.

The multi-degrees of freedom magnetic levitation system according to the eighth embodiment of the present disclosure may adjust a direction and an intensity of the current independently applied to each of the first winding 861, the second winding 862, the third winding 863 and the fourth winding 864 to control the position of the magnetically-levitated object 10 in each of the Z-axis, X-axis, and Y-axis directions.

A process in which the multi-degrees of freedom magnetic levitation system according to the eighth embodiment of the present disclosure controls the position of the magnetically-levitated object 10 in each of the Z-axis, X-axis, and Y-axis directions is identical with a process in which the multi-degrees of freedom magnetic levitation system according to the seventh embodiment of the present disclosure controls the position of the magnetically-levitated object 10 in each of the Z-axis, X-axis, and Y-axis directions. Thus, a detailed description thereof will be omitted.

The multi-degrees of freedom magnetic levitation system including the actuator according to each of the embodiments of the present disclosure has following effects. When the magnetically-levitated object is positioned between the at least two iron cores, a magnetic circuit may be generated between the iron cores, the permanent magnet and the magnetically-levitated object, without application of the current, thereby providing a bias magnetic force required to magnetically-levitate the object. Thus, the power consumption for controlling the position of the magnetically-levitated object may be minimized. Further, the system may perform the multi-degrees of freedom magnetic levitation control in which the object may move in each of the Z-axis, X-axis and Y-axis directions, via application of the current to each of the windings.

The descriptions of the presented embodiments have been provided so that a person of ordinary skill in the art of any the present disclosure may use or practice the present disclosure. Various modifications to these embodiments will be apparent to those skilled in the art of the present disclosure, and the general principles defined herein may be applied to other embodiments without departing from the scope of the present disclosure. Thus, the present disclosure is not intended to be limited to the embodiments presented herein, but is to be construed in the widest scope consistent with the principles and novel features presented herein.

The invention claimed is:

1. An actuator comprising:
   at least two iron cores, each iron core including a pole extending in a first direction parallel to a direction of gravity;
   a permanent magnet disposed between the at least two iron cores so as to generate a magnetic field along a shape of a combination of the at least two iron cores arranged so as to be adjacent to each other in a direction not parallel to the first direction; and
   a winding wound around the pole of each of the at least two iron cores,
   wherein the at least two iron cores include:
   a first iron core including a first pole extending in the first direction and a second pole extending in a second direction perpendicular to the first direction from one side end of the first pole; and
   a second iron core including a third pole extending in a parallel manner to the extension direction of the first pole, and a fourth pole extending in a parallel manner to the extension direction of the second pole from one side end of the third pole and having an end face facing the end face of the second pole,
   wherein the winding includes:
   a first winding wound around the first pole; and
   a second winding wound around the third pole,
   wherein the permanent magnet is disposed between the end face of the second pole and the end face of the fourth pole so that a first pole and a second pole thereof are in contact with the end face of the second pole and the end face of the fourth pole, respectively.

2. The actuator of claim 1, wherein a lower end of each of the first pole and the third pole has an inclined face facing an inner space defined between the first pole and the third pole.

3. An actuator comprising:
   at least two iron cores, each iron core including a pole extending in a first direction parallel to a direction of gravity;
   a permanent magnet disposed between the at least two iron cores so as to generate a magnetic field along a shape of a combination of the at least two iron cores arranged so as to be adjacent to each other in a direction not parallel to the first direction; and
   a winding wound around the pole of each of the at least two iron cores,
   wherein the at least two iron cores include:
   a first iron core disposed at a first azimuth around an imaginary axial line parallel to the first direction, wherein the first iron core includes a first pole extending in the first direction, and a second pole extending from one side end of the first pole in a second direction perpendicular to the first direction, wherein the second pole has an end face facing the axial line;
   a second iron core disposed at a second azimuth around the axial line, wherein the second iron core includes a third pole extending in a parallel manner to the extension direction of the first pole, and a fourth pole extending from one side end of the third pole in the second direction, wherein the fourth pole has an end face facing the axial line; and
   a third iron core disposed at a third azimuth around the axial line, wherein the third iron core includes a fifth pole extending in a parallel manner to the extension direction of the first pole, and a sixth pole extending from one side end of the fifth pole in the second direction, wherein the sixth pole has an end face facing the axial line,
   wherein the winding includes:
   a first winding wound around the first pole;
   a second winding wound around the third pole; and
   a third winding wound around the fifth pole;
   wherein the permanent magnet includes:
   a first permanent magnet fixed to the end face of the second pole so that a magnetic flux thereof is directed toward the axial line;
   a second permanent magnet fixed to the end face of the fourth pole so that a magnetic flux thereof is directed toward the axial line; and
   a third permanent magnet fixed to the end face of the sixth pole so that a magnetic flux thereof is directed toward the end face of the sixth pole.

4. The actuator of claim 3, wherein a lower end of each of the first pole, the third pole and the fifth pole has an inclined face facing an inner space defined between the first pole, the third pole and the fifth pole.

5. An actuator comprising:
   at least two iron cores, each iron core including a pole extending in a first direction parallel to a direction of gravity;
   a permanent magnet disposed between the at least two iron cores so as to generate a magnetic field along a shape of a combination of the at least two iron cores arranged so as to be adjacent to each other in a direction not parallel to the first direction; and
   a winding wound around the pole of each of the at least two iron cores,
   wherein the at least two iron cores include:
   a first iron core including a first pole extending in the first direction, and a second pole extending in a second direction perpendicular to the first direction from one side end of the first pole;
   a second iron core including a third pole extending in a parallel manner to the extension direction of the first pole, and a fourth pole extending in a parallel manner to the extension direction of the second pole from one side end of the third pole and having an end face facing an end face of the second pole;
   a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and
   a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole, wherein the winding includes:
a first winding wound around the first pole;
a second winding wound around the third pole;
a third winding wound around the fifth pole; and
a fourth winding wound around the seventh pole,
wherein the permanent magnet includes:
a first permanent magnet fixed to the end face of the second pole such that a magnetic flux thereof is directed toward the end face of the fourth pole facing the end face of the second pole;
a second permanent magnet fixed to the end face of the fourth pole such that a magnetic flux thereof is directed toward the end face of the fourth pole;
a third permanent magnet fixed to the end face of the sixth pole such that a magnetic flux thereof is directed toward the end face of the eighth pole facing the end face of the sixth pole; and
a fourth permanent magnet fixed to the end face of the eighth pole such that a magnetic flux thereof is directed toward the end face of the eighth pole.

6. An actuator comprising:
at least two iron cores, each iron core including a pole extending in a first direction parallel to a direction of gravity;
a permanent magnet disposed between the at least two iron cores so as to generate a magnetic field along a shape of a combination of the at least two iron cores arranged so as to be adjacent to each other in a direction not parallel to the first direction; and
a winding wound around the pole of each of the at least two iron cores,
wherein the at least two iron cores include:
a first iron core including a first pole extending in the first direction, and a second pole extending in a second direction perpendicular to the first direction from one side end of the first pole;
a second iron core including a third pole extending in a parallel manner to the extension direction of the first pole, and a fourth pole extending in a parallel manner to the extension direction of the second pole from one side end of the third pole and having an end face facing an end face of the second pole;
a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and
a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole,
wherein the winding includes:
a first winding wound around the first pole;
a second winding wound around the third pole;
a third winding wound around the fifth pole; and
a fourth winding wound around the seventh pole,
wherein the permanent magnet includes:
a first permanent magnet fixed to the end face of the second pole such that a magnetic flux thereof is directed toward the end face of the fourth pole facing the end face of the second pole;
a second permanent magnet fixed to the end face of the fourth pole such that a magnetic flux thereof is directed toward the end face of the second pole;
a third permanent magnet fixed to the end face of the sixth pole such that a magnetic flux thereof is directed toward the end face of the sixth pole; and
a fourth permanent magnet fixed to the end face of the eighth pole so that a magnetic flux thereof is directed toward the end face of the eighth pole.

7. The actuator of claim 5, wherein a lower end of each of the first pole, the third pole, the fifth pole and the seventh pole has an inclined face facing an inner space defined between the first pole, the third pole, the fifth pole and the eighth pole.

8. The actuator of claim 6, wherein a lower end of each of the first pole, the third pole, the fifth pole and the seventh pole has an inclined face facing an inner space defined between the first pole, the third pole, the fifth pole and the eighth pole.

9. An actuator comprising:
at least two iron cores, each iron core including a pole extending in a first direction parallel to a direction of gravity;
a permanent magnet disposed between the at least two iron cores so as to generate a magnetic field along a shape of a combination of the at least two iron cores arranged so as to be adjacent to each other in a direction not parallel to the first direction; and
a winding wound around the pole of each of the at least two iron cores,
wherein the at least two iron cores include:
a first iron core disposed at a first azimuth around an imaginary axial line parallel to the first direction, wherein the first iron core includes a first pole extending in the first direction, and a second pole extending in a second direction perpendicular to the first direction from one side end of the first pole and having an end face facing the axial line;
a second iron core disposed at a second azimuth around the axial line, wherein the second iron core includes a third pole extending in a parallel manner to the extension direction of the first pole, and a fourth pole extending in the second direction from one side end of the third pole and having an end face facing the axial line; and
a third iron core disposed at a third azimuth around the axial line, wherein the third iron core includes a fifth pole extending in a parallel manner to the extension direction of the first pole, and a sixth pole extending from one side end of the fifth pole in the second direction and having an end face facing the axial line,
wherein the winding includes:
a first winding wound around the first pole;
a second winding wound around the third pole; and
a third winding wound around the fifth pole,
wherein the actuator further comprises a central iron core disposed under the end faces of the second pole, the fourth pole, and the sixth pole and being in contact with the second pole, the fourth pole and the sixth pole, wherein the central iron core extends in a parallel manner to the first direction,
wherein the permanent magnet is fixed to a bottom face of the central iron core such that a magnetic flux thereof is directed away from the bottom face of the central iron core.

10. An actuator comprising:
at least two iron cores, each iron core including a pole extending in a first direction parallel to a direction of gravity;
a permanent magnet disposed between the at least two iron cores so as to generate a magnetic field along a shape of a combination of the at least two iron cores arranged so as to be adjacent to each other in a direction not parallel to the first direction; and
a winding wound around the pole of each of the at least two iron cores,
wherein the at least two iron cores include:
a first iron core disposed at a first azimuth around an imaginary axial line parallel to the first direction, wherein the first iron core includes a first pole extending in the first direction, and a second pole extending in a second direction perpendicular to the first direction from one side end of the first pole and having an end face facing the axial line;
a second iron core disposed at a second azimuth around the axial line, wherein the second iron core includes a third pole extending in a parallel manner to the extension direction of the first pole, and a fourth pole extending in the second direction from one side end of the third pole and having an end face facing the axial line; and
a third iron core disposed at a third azimuth around the axial line, wherein the third iron core includes a fifth pole extending in a parallel manner to the extension direction of the first pole, and a sixth pole extending from one side end of the fifth pole in the second direction and having an end face facing the axial line,
wherein the actuator further comprises a central iron core in contact with the first to third permanent magnets and disposed under the first to third permanent magnets, wherein the central iron core extends in a parallel manner to the first direction,
wherein the winding includes:
a first winding wound around the first pole;
a second winding wound around the third pole; and
a third winding wound around the fifth pole,
wherein the permanent magnet includes:
a first permanent magnet fixed to the end face of the second pole so that a magnetic flux thereof is directed toward the axial line;
a second permanent magnet fixed to the end face of the fourth pole so that a magnetic flux thereof is directed toward the axial line; and
a third permanent magnet fixed to the end face of the sixth pole so that a magnetic flux thereof is directed toward the axial line.

11. The actuator of claim 9, wherein a lower end of each of the first pole, the third pole and the fifth pole has an inclined face facing an inner space defined between the first pole, the third pole and the fifth pole.

12. The actuator of claim 10, wherein a lower end of each of the first pole, the third pole and the fifth pole has an inclined face facing an inner space defined between the first pole, the third pole and the fifth pole.

13. An actuator comprising:
at least two iron cores, each iron core including a pole extending in a first direction parallel to a direction of gravity;
a permanent magnet disposed between the at least two iron cores so as to generate a magnetic field along a shape of a combination of the at least two iron cores arranged so as to be adjacent to each other in a direction not parallel to the first direction; and
a winding wound around the pole of each of the at least two iron cores,
wherein the at least two iron cores include:
a first iron core including a first pole extending in the first direction, and a second pole extending in a second direction perpendicular to the first direction from one side end of the first pole;
a second iron core including a third pole extending in a parallel manner to the extension direction of the first pole, and a fourth pole extending in a parallel manner to the extension direction of the second pole from one side end of the third pole and having an end face facing an end face of the second pole;
a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and
a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole,
wherein the actuator further comprises a central iron core contacting the second pole, the fourth pole, the sixth pole and the eighth pole and disposed under the end faces of the second pole, the fourth pole, the sixth pole and the eighth pole, wherein the central iron core extends in a parallel manner to the first direction,
wherein the winding includes:
a first winding wound around the first pole;
a second winding wound around the third pole;
a third winding wound around the fifth pole; and
a fourth winding wound around the seventh pole,
wherein the permanent magnet is fixed to a bottom face of the central iron core such that a magnetic flux thereof is directed away from the bottom face of the central iron core.

14. An actuator comprising:
at least two iron cores, each iron core including a pole extending in a first direction parallel to a direction of gravity;
a permanent magnet disposed between the at least two iron cores so as to generate a magnetic field along a shape of a combination of the at least two iron cores arranged so as to be adjacent to each other in a direction not parallel to the first direction; and
a winding wound around the pole of each of the at least two iron cores,
wherein the at least two iron cores include:
a first iron core including a first pole extending in the first direction, and a second pole extending in a second direction perpendicular to the first direction from one side end of the first pole;
a second iron core including a third pole extending in a parallel manner to the extension direction of the first pole, and a fourth pole extending in a parallel manner to the extension direction of the second pole from one side end of the third pole and having an end face facing an end face of the second pole;

a third iron core including a fifth pole extending in a parallel manner to the extension direction of the first pole, and a sixth pole extending in the second direction from one side end of the fifth pole, wherein the third iron core is adjacent to the first iron core and the second iron core such that an angle defined between an end face of the sixth pole and each of the end face of the second pole and the end face of the fourth pole is a right angle; and a fourth iron core including a seventh pole extending in a parallel manner to the extension direction of the first pole, and an eighth pole extending in a parallel manner to the extension direction of the sixth pole from one side end of the seventh pole and having an end face facing the end face of the sixth pole, wherein the winding includes:

a first winding wound around the first pole;

a second winding wound around the third pole;

a third winding wound around the fifth pole; and a fourth winding wound around the seventh pole, wherein the permanent magnet includes:

a first permanent magnet fixed to the end face of the second pole such that a magnetic flux thereof is directed toward the end face of the fourth pole facing the end face of the second pole;

a second permanent magnet fixed to the end face of the fourth pole such that a magnetic flux thereof is directed toward the end face of the second pole;

a third permanent magnet fixed to the end face of the sixth pole so that a magnetic flux thereof is directed toward the end face of the eighth pole facing the end face of the sixth pole; and a fourth permanent magnet fixed to the end face of the eighth pole so that a magnetic flux thereof is directed toward the end face of the sixth pole, wherein the actuator further comprises a central iron core contacting the first to fourth permanent magnets and disposed under the first to fourth permanent magnets, wherein the central iron core extends in a parallel manner to the first direction.

15. The actuator of claim 13, wherein a lower end of each of the first pole, the third pole, the fifth pole and the seventh pole has an inclined face facing an inner space defined between the first pole, the third pole, the fifth pole and the eighth pole.

16. The actuator of claim 14, wherein a lower end of each of the first pole, the third pole, the fifth pole and the seventh pole has an inclined face facing an inner space defined between the first pole, the third pole, the fifth pole and the eighth pole.

17. A multi-degrees of freedom magnetic levitating system comprising:

an actuator comprising at least two iron cores, each iron core including a pole extending in a first direction parallel to a direction of gravity, a permanent magnet disposed between the at least two iron cores so as to generate a magnetic field along a shape of a combination of the at least two iron cores arranged so as to be adjacent to each other in a direction not parallel to the first direction, and a winding wound around the pole of each of the at least two iron cores; and a sensor module including at least two optical-fiber sensors, wherein each of the at least two optical-fiber sensors is disposed under each winding of the actuator, wherein the at least two optical-fiber sensors measure a position of a magnetically-levitated body, wherein the system is configured to apply a current to each winding to control the position of the magnetically-levitated body, based on the measured position of the magnetically-levitated body.

* * * * *